United States Patent
Bickley et al.

(10) Patent No.: US 11,722,167 B2
(45) Date of Patent: *Aug. 8, 2023

(54) PROTECTIVE CASE FOR ELECTRONIC DEVICE

(71) Applicant: Otter Products, LLC, Fort Collins, CO (US)

(72) Inventors: Patrick M. Bickley, Timnath, CO (US); Todd C. Adelmann, Placitas, NM (US)

(73) Assignee: Otter Products, LLC

( * ) Notice: Subject to any disclaimer, the term of this patent is extended or adjusted under 35 U.S.C. 154(b) by 0 days.

This patent is subject to a terminal disclaimer.

(21) Appl. No.: 17/713,657

(22) Filed: Apr. 5, 2022

(65) Prior Publication Data

US 2022/0231720 A1 Jul. 21, 2022

Related U.S. Application Data

(63) Continuation of application No. 16/930,572, filed on Jul. 16, 2020, now Pat. No. 11,329,685.

(60) Provisional application No. 62/879,815, filed on Jul. 29, 2019.

(51) Int. Cl.
  *H04B 1/3888* (2015.01)
  *H01Q 1/24* (2006.01)
  *H01Q 1/44* (2006.01)

(52) U.S. Cl.
  CPC ........... *H04B 1/3888* (2013.01); *H01Q 1/242* (2013.01); *H01Q 1/44* (2013.01)

(58) Field of Classification Search
  CPC ........ H04B 1/3888; H01Q 1/242; H01Q 1/44; H01Q 1/422; H01Q 1/243
  See application file for complete search history.

(56) References Cited

U.S. PATENT DOCUMENTS

| | | |
|---|---|---|
| 6,249,256 B1 | 6/2001 | Luxon et al. |
| 7,876,272 B2 | 1/2011 | Dou et al. |
| 8,208,980 B2 | 6/2012 | Wong et al. |
| 8,214,003 B2 | 7/2012 | Wong et al. |
| 8,442,602 B2 | 5/2013 | Wong et al. |
| 8,750,948 B2 | 6/2014 | Wong et al. |
| 8,954,122 B2 | 2/2015 | Wilmhoff et al. |
| 8,957,813 B2 | 2/2015 | McCaughey et al. |
| 9,078,498 B2 | 7/2015 | Richardson et al. |
| 9,293,808 B1 | 3/2016 | Roberts et al. |
| 9,319,087 B1 | 4/2016 | Cox, III |
| 9,609,930 B2 | 4/2017 | Richardson et al. |
| 9,712,203 B2 | 7/2017 | Roberts et al. |

(Continued)

*Primary Examiner* — Seung H Lee

(57) ABSTRACT

A protective cover configured for use with an electronic device having antenna regions. The protective cover comprises a protective shell configured to receive the electronic device when the electronic device is installed in the protective cover. The protective shell is configured to contact and cover at least portions of the back and sides of the electronic device when the electronic device is installed in the protective shell. The protective shell includes a first material and a second material where the second material has a dielectric constant that is different than a dielectric constant of the first material in at least one operating frequency range of the electronic device. The second material is present in regions of the protective shell that are in proximity to the antenna regions of the installed electronic device.

21 Claims, 14 Drawing Sheets

(56) References Cited

U.S. PATENT DOCUMENTS

| | | | |
|---|---|---|---|
| 9,716,777 | B2 | 7/2017 | Roberts et al. |
| 9,755,682 | B2 | 9/2017 | Byler |
| 9,986,802 | B2 | 6/2018 | Richardson et al. |
| 10,090,875 | B2 | 10/2018 | McCaughey et al. |
| 10,326,488 | B2 | 6/2019 | Wojcik |
| 10,340,970 | B2 | 7/2019 | Richardson et al. |
| 11,329,685 | B2 * | 5/2022 | Bickley ................. H01Q 1/422 |
| 2003/0045246 | A1 | 3/2003 | Lee et al. |
| 2006/0022889 | A1 | 2/2006 | Chiang et al. |
| 2010/0113111 | A1 | 5/2010 | Wong et al. |
| 2010/0147737 | A1 | 6/2010 | Richardson et al. |
| 2013/0206844 | A1 | 8/2013 | Chen et al. |
| 2015/0370288 | A1 | 12/2015 | Dinesh |
| 2015/0374087 | A1 | 12/2015 | Lim et al. |
| 2016/0204499 | A1 | 7/2016 | Toh et al. |
| 2019/0165486 | A1 | 5/2019 | Yoshida |
| 2020/0321689 | A1 | 10/2020 | Witter et al. |
| 2021/0083708 | A1 | 3/2021 | Sugumaar et al. |

\* cited by examiner

cushion liner is attached to an inner surface of the outer

PROTECTIVE CASE FOR ELECTRONIC DEVICE

CROSS REFERENCE TO RELATED APPLICATIONS

The present application claims priority to pending U.S. patent application Ser. No. 16/930,572, filed Jul. 16, 2020, and U.S. Provisional Patent Application No. 62/879,815, filed Jul. 29, 2019, all of which are hereby incorporated by reference in their entireties.

FIELD

The present disclosure relates to cases, covers, and/or encasements for use with electronic devices.

BACKGROUND

Portable electronic devices are commonly used for communication and entertainment purposes. Portable electronic devices include devices such as smartphones, cellular phones, mobile communication devices, computers, portable computing devices, mobile computing devices, tablet computers, cameras, video players, smart watches, audio players, electronic media readers, two-way radios, global positioning satellite (GPS) devices, measurement instruments, and/or other types of electronic, computing, or communication devices, including combinations thereof. Cases, protective cases, covers, protective covers, enclosures, or encasements are sometimes installed on or over housings of these types of electronic devices in order to protect the electronic devices from damage due to exposure to shock, impact, dropping, puncture, dust, dirt, water, snow, rain, mud, chemicals, and/or other potentially damaging forces or elements. The term "case" is used herein to refer to any type of case, cover, protective case, protective cover, enclosure, encasement, shell, or combination thereof. Cases are also sometimes used to supplement the functionality of the device and/or to change the aesthetics of the device.

Electronic devices transmit and receive data over wireless communication networks. In order to achieve higher data rates, cellular communication networks are implementing new types of communication services using new formats, new modulation schemes, new protocols, and/or in new frequency bands. In one example, a fifth generation ("5G") digital cellular network is being implemented. The 5G networks operate according to standards set forth by the 3rd Generation Partnership Project ("3GPP") TF 21.915 Release 15. To achieve the higher data rates, many 5G networks utilize radio waves in or near the millimeter wave band above 3 GHz, and in some more particular cases in ranges of 20 GHz to 28 GHz, and in other cases in ranges from 30 GHz to 300 GHz. Many of the 5G services utilize higher frequencies than earlier generations of service and device, which typically operate in the microwave band between 700 MHz and 3 GHz.

Electronic devices utilizing 5G networks, and other networks in the GHz frequency ranges, to transmit and/or receive data typically have one or more internal antennas for communicating with the network. Improved systems, apparatuses, and methods for protecting electronic devices with 5G antennas and other problems are desired.

SUMMARY

In one embodiment, a protective case for an electronic device includes an outer shell and an inner cushion liner. The inner cushion liner is attached to an inner surface of the outer shell. The inner cushion layer is configured to receive the electronic device when the electronic device is installed in the protective case and is configured to contact and cover at least portions of the back and sides of the installed electronic device. The inner cushion liner comprises a first material for cushioning the installed electronic device as well as one or more regions of a second material configured to be in proximity to one or more antenna regions of the installed electronic device, respectively. The second material has a lower dielectric constant than the first material in at least a preferred frequency range of the electronic device. For various reasons, it may not be desirable to fabricate the entire inner cushion liner from the second material.

In another exemplary embodiment, a protective case for an electronic device having a display, a first 5G antenna region on a rear surface of the electronic device, and a second 5G antenna on a side surface of the electronic device is provided. The protective case includes a first opening providing access to the display of the installed electronic device. The protective case includes a first antenna region opening on a rear surface of the protective case aligned with the first 5G antenna region providing direct access to the first 5G antenna region of the installed electronic device The protective case includes a second antenna region opening on a side surface of the protective case aligned with the second 5G antenna region providing direct access to the second 5G antenna of the installed electronic device.

In another exemplary embodiment, a protective cover is configured for use with an electronic device having two or more antenna regions. The protective cover comprises a protective shell configured to receive the electronic device when the electronic device is installed in the protective cover. The protective shell is configured to contact and cover at least portions of the back and sides of the electronic device when the electronic device is installed in the protective shell. The protective shell includes a first material and a second material where the second material has a dielectric constant that is different than a dielectric constant of the first material in at least one operating frequency range of the electronic device. The second material is present in two or more regions of the protective shell. Each of the two or more regions is in proximity to a respective one of the two or more antenna regions of the installed electronic device.

In some embodiments, the protective case is a two-piece case comprising an inner cushion layer that surrounds a portion of the electronic device when the electronic device is installed in the protective case and a more rigid outer shell including one or more curved side walls configured to releasably engage the inner cushion layer. In an even more particular embodiment, the inner cushion layer includes a first material and the outer shell includes a second material, the first material and the second material each being substantially opaque to radio waves having a frequency from 30 GHz to 300 GHz. In another more particular embodiments, the first antenna region opening includes a first aperture through the inner cushion layer and a first aperture through the outer shell. In a still more particular embodiment, the first antenna region opening is further configured to be aligned with a camera region of the electronic device and provide direct access to the camera region when the electronic device is installed in the protective case. In another still more particular embodiment, the protective case further includes a camera region opening on the back surface of the protective case, the camera region opening being separate and distinct from the first antenna region opening, the camera region opening comprising a second aperture through the inner cushion layer and a second aperture through the outer shell. In another more particular embodiment, the first opening and the first antenna region opening are separated by a boundary comprising the inner cushion layer. In a still more particular embodiment, the boundary further includes the outer shell. In another more particular embodiment, the first opening and the first antenna region opening comprise a single aperture defined by a single perimeter. In another more particular embodiment, the case further includes a third antenna region opening on a side surface of the protective case, the third antenna region opening configured to be aligned with and provide direct access to a third 5G antenna region on a side surface of the electronic device when the electronic device is installed in the protective case. In a still more particular embodiment, the first opening, the first antenna region opening, and the second antenna region opening comprise a single aperture defined by a single perimeter.

In some embodiments, the protective case is a one-piece case comprising a cushioning member that surrounds a portion of the electronic device when the electronic device is installed in the protective case and a more rigid structural member permanently affixed to the cushioning member. In a more particular embodiment, the cushioning member includes a first material and the structural member includes a second material, the first material and the second material each being substantially opaque to radio waves having a frequency from 30 GHz to 300 GHz. In another more particular embodiment, the first antenna region opening includes a first aperture through the cushioning member and a first aperture through the structural member. In a still more particular embodiment, the first antenna region opening is further configured to be aligned with a camera region of the electronic device and provide direct access to the camera region when the electronic device is installed in the protective case. In another still more particular embodiment, the protective case further includes a camera region opening on the back surface of the protective case, the camera region opening being separate and distinct from the first antenna region opening, the camera region opening comprising a second aperture through the cushioning member and a second aperture through the structural member. In another more particular embodiment, the first opening and the first antenna region opening are separated by a boundary comprising the cushioning member. In a still more particular embodiment, the boundary further includes the structural member. In another more particular embodiment, the first opening and the first antenna region opening comprise a single aperture defined by a single perimeter. In another more particular embodiment, the case further includes a third antenna region opening on a side surface of the protective case, the third antenna region opening configured to be aligned with and provide direct access to a third 5G antenna region on a side surface of the electronic device when the electronic device is installed in the protective case. In a still more particular embodiment, the first opening, the first antenna region opening, and the second antenna region opening comprise a single aperture defined by a single perimeter. In another embodiment, at least a portion of the cushioning member and a portion of the structural member includes a transparent material.

In some embodiments, the protective case is a multi-layer case comprising a rigid shell that surrounds a portion of the electronic device when the electronic device is installed in the protective case and a cushion layer removably disposable over the rigid shell. In a more particular embodiment, the rigid shell includes a first material and the cushion layer includes a second material, the first material and the second material each being substantially opaque to radio waves having a frequency from 30 GHz to 300 GHz. In a more particular embodiment, the first antenna region opening includes a first aperture through the rigid shell and a first aperture through the cushion layer. In a still more particular embodiment, the first antenna region opening is further configured to be aligned with a camera region of the electronic device and provide direct access to the camera region when the electronic device is installed in the protective case. In another still more particular embodiment, the protective case further includes a camera region opening on the rear surface of the protective case, the camera region opening being separate and distinct from the first antenna region opening, the camera region opening comprising a second aperture through the rigid shell and a second aperture through the cushion layer. In another more particular embodiment, the case further includes an inner foam liner affixed to the rigid shell and configured to contact at least a portion of a rear surface of the electronic device when the electronic device is installed in the protective case. In a still more particular embodiment, the first antenna region opening includes a first aperture through the rigid shell, a first aperture through the cushion layer, and a first aperture through the inner foam liner. In another more particular embodiment, the first opening and the first antenna region opening are separated by a boundary comprising the rigid shell. In a still more particular embodiment, the boundary further includes the cushion layer. In another more particular embodiment, the first opening and the first antenna region opening comprise a single aperture defined by a single perimeter. In another more particular embodiment, the case further includes a third antenna region opening on a side surface of the protective case, the third antenna region opening configured to be aligned with and provide direct access to a third 5G antenna region on a side surface of the electronic device when the electronic device is installed in the protective case. In still another more particular embodiment, the first opening, the first antenna region opening, and the second antenna region opening comprise a single aperture defined by a single perimeter.

In some embodiments, the protective case includes a holster. In a more particular embodiment, the holster includes a back, at least two receivers positioned along a first edge of the back and configured to releasably engage a side of protective case, and a flexible arm positioned along a second edge of the back opposite the first edge, the flexible arm including a latch configured to engage a receiver on the protective case to secure the protective case to the holster. In a still more particular embodiment, the holster includes a first open area positioned between the two receivers, the first open area configured to provide direct access to the second antenna region on the side surface of the electronic device through the second antenna region opening of the protective case when the electronic device is installed in the protective case and the protective case is secured in the holster. In another still more particular embodiment, the holster includes a second open area positioned between the flexible arm and a corner of the holster, the second open area configured to provide direct access to the second antenna region on the side surface of the electronic device through the second antenna region opening of the protective case when the electronic device is installed in the protective case and the protective case is secured in the holster. In another still more particular embodiment, the holster includes a third open area positioned on the back of the holster, the third open area configured to provide direct access to the first antenna region of the electronic device on the rear surface of the electronic device through the first antenna region opening of the protective case when the electronic device is installed in the protective case and the protective case is secured in the holster. In an even still more particular embodiment, the third open area is an aperture formed in the back of the holster.

In one exemplary embodiment, a holster for an electronic device is provided. The electronic device has a first 5G antenna region on a rear surface of the electronic device and a second 5G antenna region on a side surface of the electronic device. The holster includes a back including a first open area configured to provide direct access to the first antenna region of the electronic device when the electronic device is secured to the holster. The holster also includes at least two receivers positioned along a first edge of the back and configured to releasably engage a side of electronic device. The holster also includes a flexible arm positioned along a second edge of the back opposite the first edge, the flexible arm including a latch configured to engage a receiver on the electronic device to secure the electronic device to the holster. In a more particular embodiment, the holster also includes a second open area positioned between the two receivers, the second open area configured to provide direct access to the second antenna region on the side surface of the electronic device when the electronic device is secured in the holster. In another more particular embodiment, the holster also includes a third open area positioned between the flexible arm and a corner of the holster, the third open area configured to provide direct access to the second antenna region on the side surface of the electronic device when the electronic device is secured in the holster. In another more particular embodiment, the first open area is an aperture formed in the back of the holster. In another more particular embodiment, the holster also includes a second open area positioned between the two receivers and a third open area positioned between the flexible arm and a corner of the holster, wherein the second open area is configured to provide direct access to the second antenna region on the side surface of the electronic device when the electronic device is secured in the holster in a first configuration, and wherein the third open area configured to provide direct access to the second antenna region on the side surface of the electronic device when the electronic device is secured in the holster in a second configuration. In a still more particular embodiment, the third open area is configured to provide direct access to a third antenna region positioned on a second side surface of the electronic device when the electronic device is secured in the holster in the first configuration and the second open area is configured to provide direct access to the third antenna region when the electronic device is secured in the holster in the second configuration.

Various other embodiments and variations of the disclosed techniques and methods are possible. While multiple embodiments are disclosed, still other embodiments will become apparent to those skilled in the art from the following detailed description and figures, which describe and show illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

The present invention will be described and explained through the use of the accompanying drawings in which.

DETAILED DESCRIPTION

In the following detailed description, various specific details are set forth in order to provide an understanding of and describe the apparatuses and techniques introduced here. However, the techniques may be practiced without the specific details set forth in these examples. Various alternatives, modifications, and/or equivalents will be apparent to those skilled in the art without varying from the spirit of the introduced apparatuses and techniques. For example, while the embodiments described herein refer to particular features, the scope of this solution also includes embodiments having different combinations of features and embodiments that do not include all of the described features. Accordingly, the scope of the techniques and solutions introduced herein are intended to embrace all such alternatives, modifications, and variations as fall within the scope of the claims, together with all equivalents thereof. Therefore, the description should not be taken as limiting the scope of the invention, which is defined by the claims.

Some of the cases described herein are described as protective cases. However, the apparatuses and techniques disclosed herein are not to be limited to any particular protective characteristic of the case and may be applicable to various types of cases, covers, and/or encasements which cover an electronic device either partially or fully and may not have any particular protective characteristic.

Figure 1:
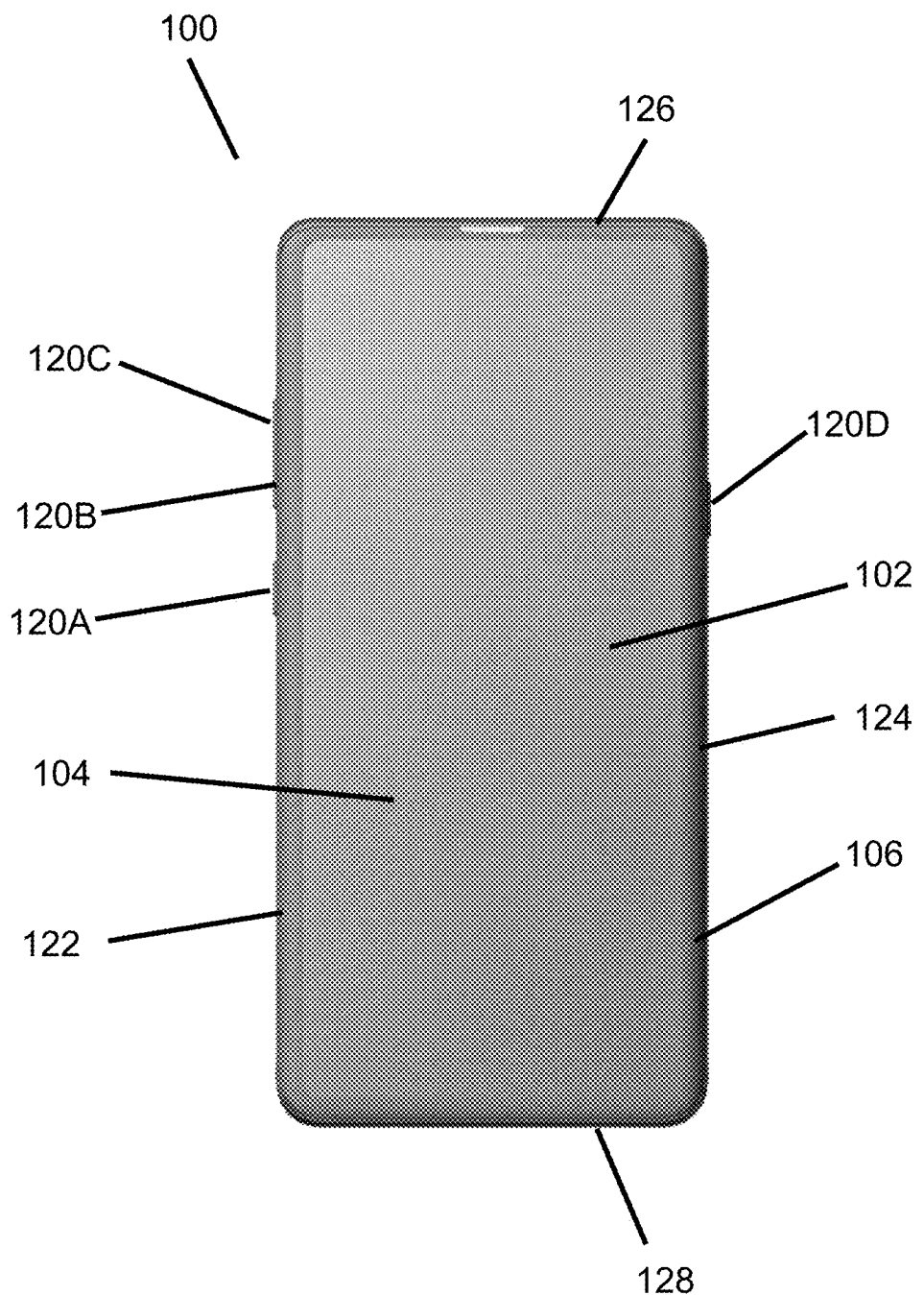
FIG. 1 illustrates a front view of an exemplary electronic device.
Figure 2:
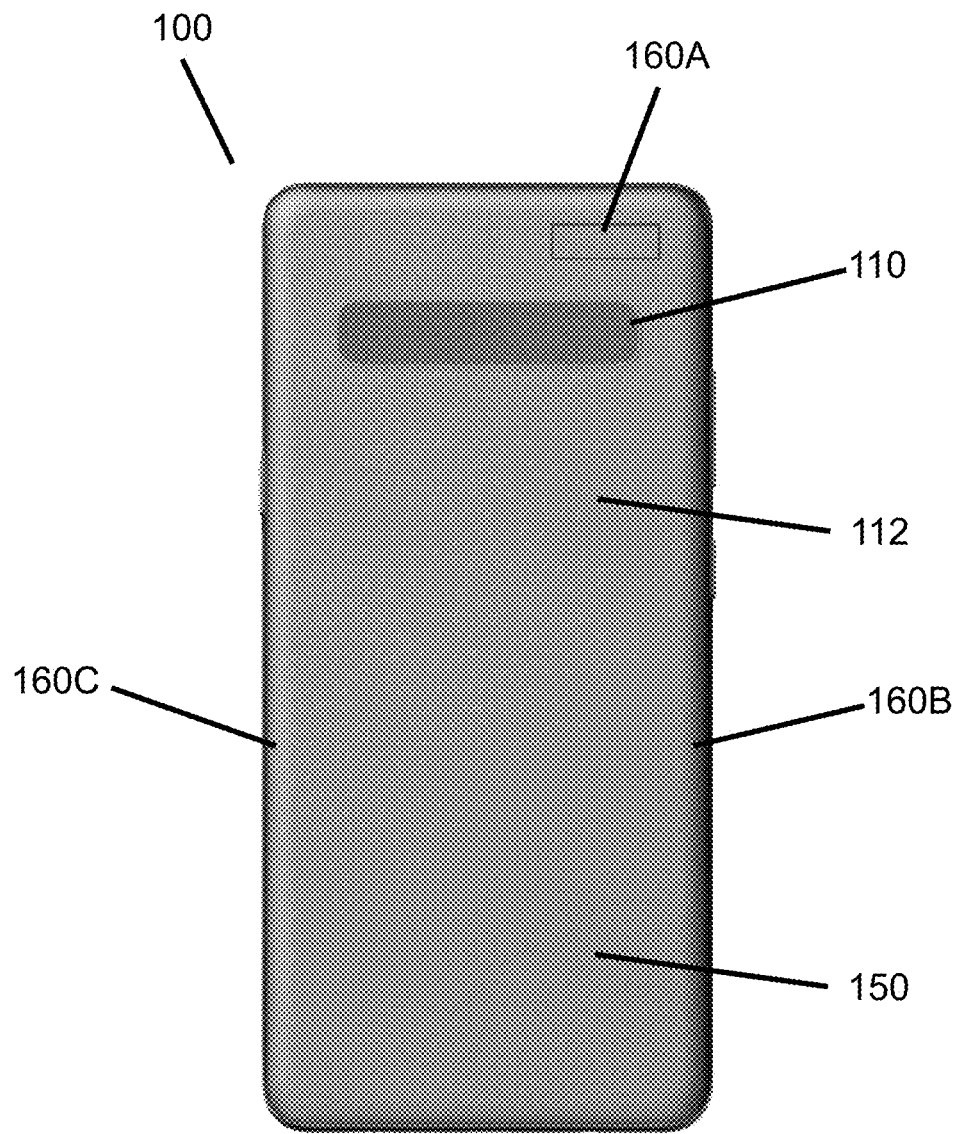
FIG. 2 illustrates a rear view of the electronic device of FIG. 1.
Figure 3:
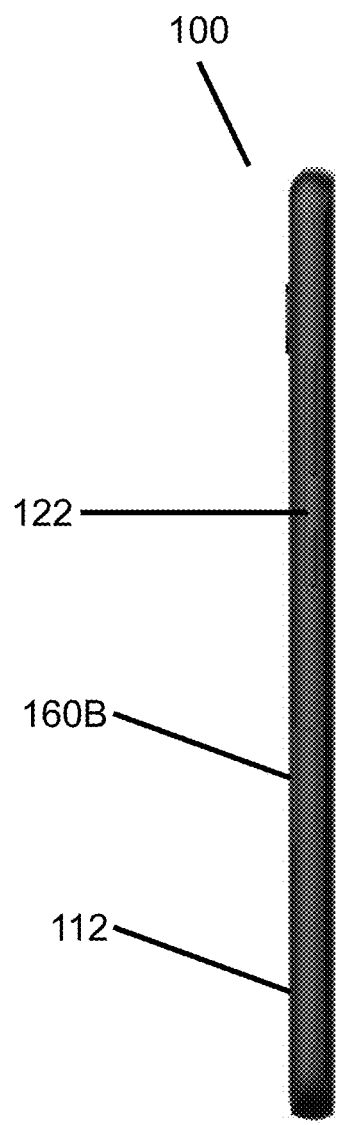
FIG. 3 illustrates a side view of the electronic device of FIG. 1.

FIGS. 1-3 illustrate an exemplary electronic device 100. Electronic device 100 may be a cellular phone, smartphone, mobile communication device, mobile computing device, portable computing device, tablet, phablet (phone/tablet), portable computer, personal video player, electronic media reader, audio player, wearable electronic device, handheld scanner, camera, GPS device, or electronic computing or communication device of another type, including combinations thereof. In one specific example, electronic device 100 may be an APPLE IPHONE. In another specific example, electronic device 100 may be a SAMSUNG GALAXY phone. In still another specific example, electronic device 100 may be a GOOGLE PIXEL phone. FIG. 1 illustrates a front view of electronic device 100. FIG. 2 illustrates a rear view of electronic device 100. FIG. 3 illustrates a side view of electronic device 100.

Electronic device 100 includes an electronic display 102, such as a touch screen display, for displaying information to a user of electronic device 100. As illustrated in FIG. 1, in some embodiments, electronic display 102 is positioned on a front surface 104 of electronic device 100. Electronic display 102 may be a touchscreen display or other type of interactive display. In some embodiments, electronic display 102 is at least partially surrounded by a bezel 106 defining at least a portion of a perimeter of a front surface 104 of electronic device 100.

Electronic device 100 includes one or more cameras positioned in a camera region 110. In some embodiments, camera region 110 is positioned on a rear surface 112 of electronic device 100. In some embodiments, one or more additional cameras are positioned on a front surface 104 of electronic device 100. As illustrated in FIG. 3, in some embodiments, camera region 110 may extend beyond the remainder of the rear surface 112 of electronic device 100. In some embodiments, camera region 110 may be associated with one or more keep-out zones, which define a field of vision of the camera or cameras in camera region 110 into which any protective case should not intrude.

Electronic device 100 includes one or more input buttons 120. In some embodiments, one or more input buttons 120A, 120B, 120C are positioned on a left side 122 and/or one or more input buttons 120D position on right side 124 of electronic device 100. In some embodiments, one or more input buttons 120 are positioned on front surface 104 and/or rear surface 112 of electronic device 100.

Electronic device 100 further includes a top surface 126 and a bottom surface 128. Electronic device 100 may include one or more features (not shown) selected from the group consisting of a microphone, a speaker, an electronic port, a charging port, a headphone port, a proximity sensor, and a fingerprint sensor positioned on front surface 104, rear surface 112, left surface 122, right surface 124, top surface 126 and/or bottom surface 128.

Electronic device 100 also includes a housing 150 at least partially covering an outer surface of electronic device 100. In some embodiments, housing 150 covers at least a portion of rear surface 112, left surface 122, and right surface 124. Housing 150 may comprise two or more components and/or two or more materials.

Electronic device 100 includes one or more antenna regions 160 each corresponding to an antenna positioned under housing 150 of electronic device 100. In many instances, these antenna(s) are positioned internal to electronic device 100 and may not be visible from the exterior of electronic device 100. In some exemplary embodiments, one or more of the antennas are 5G antennas. Although 5G protocols are exemplified in many of the presented embodiments and claims, the improvements discussed herein are not to be specifically limited to systems designated 5G or containing 5G antennas, and may pertain to any type of radio frequency (RF) communication or device in a specified frequency range. It should be understood, that many of the improvements discussed herein are targeted for applications in which communication are taking place at frequencies greater than 3 GHz. However, the improvements discussed herein may also be applicable at lower frequencies and/or with devices that use lower frequencies.

In the illustrated embodiment, electronic device 100 includes a rear antenna region 160A positioned on rear surface 112 and a left antenna region 160B positioned on left surface 122. Many other embodiments are possible. Electronic device 100 may include one, three, four, five, six, or more antenna regions. Any of these antenna regions may have different shapes and/or sizes and may be present in any location on electronic device 100.

In some embodiments, antenna regions 160 corresponding to one or more 5G antennas positioned under housing 150 or on an inside surface of housing 150. Various combinations of antennas may be used by electronic device 100 individually or in coordinated manners.

In some embodiments, each antenna region 160 may be associated with one or more keep-out zones specified by a manufacturer or service provider associated with electronic device 100. Keep-out zones define a region into which any protective case should not intrude to prevent interference with the one or more antenna in the corresponding antenna region 160.

A protective case may be used to protect electronic device. Protective cases comprise any type of protective shell, cover, covering, enclosure, bumper, frame, sheath, encasement, member, screen protector, and/or a combination thereof used with the electronic device 100. The protective case may provide protection against forces or damaging elements such as shock, impact, dropping, puncture, dust, dirt, heat, cold, water, snow, rain, mud, fluids, chemicals, and/or other potentially damaging elements. In various instances, the protective case may be waterproof, watertight, and/or water-resistant. In other examples, techniques disclosed herein may implemented in the form of a cover for electronic device 100 which provides some or all of the functions disclosed herein while having little or no protective characteristics.

The protective case may include one member or portion, two members or portions, three members or portions, or more than three members or portions that attach to each other. Some of these members may be permanently attached to each other and some of these members may be removably attachable to each other for insertion and/or removal of electronic device 100 from the protective case. In some situations, the protective case may be a one-piece case or a one-piece assembly into which electronic device 100 snaps or slides. In other situations, the protective case may contain multiple pieces that are assembled on, over, or around electronic device 100. In addition to an outer shell, the protective case may also include one or more cushion members, cushion layers, cushion liners, and/or cushion portions that are removably attached or permanently attached to any combination of the one, two, or more members. The techniques disclosed herein are not to be limited to any particular type, structure, or configuration of case.

Portions of the protective case may be made of any suitable material, including, but not limited to, polycarbonate (PC), high impact polystyrene (HIPS), nylon, fiberglass-filled nylon, acrylonitrile butadiene styrene (ABS), polyoxymethylene (POM), polyethylene terephthalate (PET), thermoplastic elastomer (TPE), silicone, ceramic, metallized ceramic, aluminum, aluminum alloy, titanium, wood, carbon fiber, and/or any combination thereof. Without wishing to be held to any particular theory, it is believed that certain materials are substantially opaque to radio waves having wavelengths commonly used in 5G networks, or at least relatively opaque as compared to other of the materials.

Many protective case designs include an outer shell and an inner cushion layer. The outer shell is often rigid, or semi-rigid, and tends to protect against impact, punctures, bending, and scratches, as well as resist wear, abrasion, liquids, chemicals, and/or degradation due to ultraviolet light. The inner cushion layer often comprises a more compliant and resilient material that is able to absorb some of the energy from impacts of drops thereby cushioning and further protecting the electronic device inside.

Generally, frequencies in or near the millimeter wave band above 3 GHz, and in some more particular cases from 30 GHz to 300 GHz, are blocked or substantially blocked by certain materials typically used in the construction of protective cases. The nature of mobile networks and mobile devices are such that the signals being received and transmitted are relatively weak. In some situations, a protective case installed on or around and electronic device may weaken the signals the signals to/from the electronic device to a point where the electronic is not functional, becomes less functional, and/or does not meet one or more specifications. The magnitude of the effects that the case materials have on these signals is frequency dependent and, for typical materials, become a bigger issue at frequencies above 3 GHz. Therefore, without the improvements discussed herein, the electronic device 100 may not be able to communicate, or may have significantly reduced communication capabilities with a 5G, or similar, network when positioned within a typical protective case.

For at least the reasons discussed above, a variety of factors may play a role in choosing material(s) for the outer shell, the inner cushion liner, as well as other components of the protective case. In the frequency ranges sometimes associated with 5G signals, additional factors may have to be considered such as the electrical characteristics of the materials in these frequency ranges. For example, permittivity, dielectric constant, and/or dielectric loss tangent of the materials may need to be considered in designing a protective case which has a reduced effect on the RF signals.

Absolute permittivity, sometimes simply called permittivity, is the measure of capacitance that is encountered when forming an electric field in a particular material or medium. More specifically, permittivity describes the amount of charge needed to generate one unit of electric flux in a given medium. A charge will yield more electric flux in a medium with low permittivity than in a medium with high permittivity. Permittivity is the measure of a material's ability to store an electric field in the polarization of the medium. The lowest possible permittivity is that of a vacuum, and is sometimes call vacuum permittivity or the electric constant. The permittivity of a dielectric medium is often represented by the ratio of its absolute permittivity to the electric constant. This dimensionless quantity is the medium's permittivity, but is also sometimes simply called its permittivity. Relative permittivity is also sometimes referred to as the material's dielectric constant. Dielectric loss quantifies a dielectric material's inherent dissipation of RF or electromagnetic energy. The loss tangent of a material or medium at a particular frequency is the ratio of the magnitudes of the imaginary and real components of the complex permittivity.

Figure 4A:
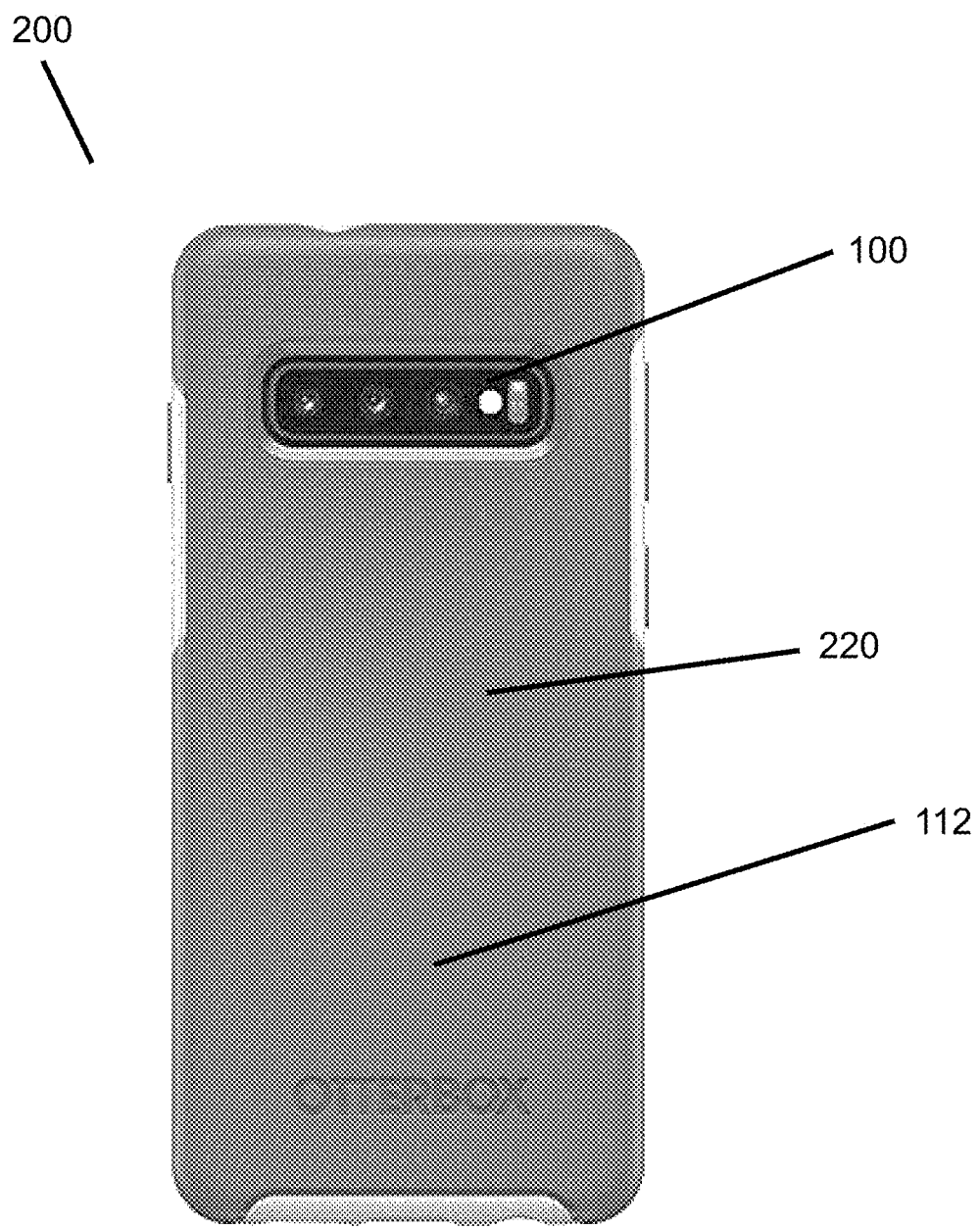
FIG. 4A illustrates a rear view of the electronic device of FIG. 1 installed in a first exemplary embodiment of a protective case.

FIG. 4A illustrates a rear view of a first exemplary embodiment of a protective case 200 with electronic device 100 installed. The touchscreen 102 of electronic device 100 is primarily visible from a side opposite that illustrated in FIG. 4A. Rear surface 112 of protective case of 200 is primarily comprised of outer shell 220. The inner cushion layer primarily resides an inside surface of outer shell 220 between the inside surface of outer shell 220 and a back surface of the installed electronic device 100. Material and geometry selection for outer shell 220 do play a role reducing the effect of protective case 200 on high frequency signals. However, the typical materials and dimensions of the inner cushion layer typically result in it having a larger impact. Therefore, the majority of the discussion herein relates to alternative designs for the inner cushion layer. However, as mentioned below, design and material changes to outer shell 220 may also be implemented in conjunction with the other solutions provided herein.

Figure 4B:
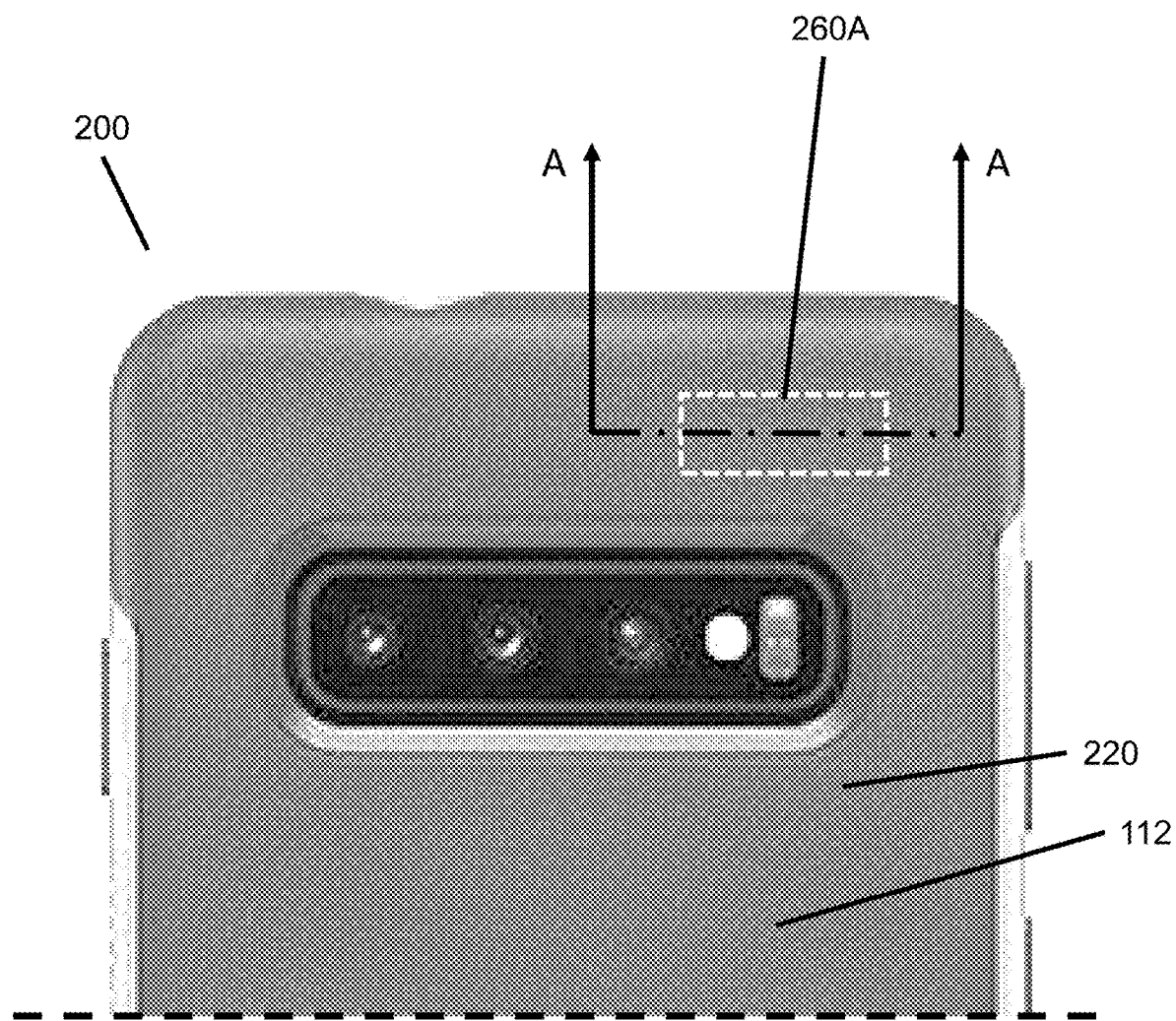
FIG. 4B illustrates a close up rear view of a portion of the electronic device and protective case of FIG. 4A.

FIG. 4B illustrates a close up rear view of a portion of protective case 200 of FIG. 4A with electronic device 100 installed (from the opposite side). Although not necessarily physically visible on the actual article, antenna region 260A of protective case 200 is identified for purposes of discussion and explanation. Antenna region 260A coincides with, aligns with, and/or is proximal to antenna region 160A of electronic device 100 when electronic device 100 is installed in protective case 200. Therefore, the electrical characteristics of antenna region 260A are important with respect to reducing the effect of protective case 200 on the RF signals received/transmitted by the antenna of electronic device 100 associated with antenna region 160A. Antenna regions are sometimes placed in areas where a user may be less likely to hold electronic device 100 in order to reduce the chances that the user's hand may also block the RF signals. Antenna regions 160A and 260A may be located in any location on electronic device 100 and protective case 200, respectively, and may be any shape or size. A cross section A-A is identified in FIG. 4B. Cross section A-A will be used to illustrate the various structures and solutions disclosed herein.

Figure 4C:
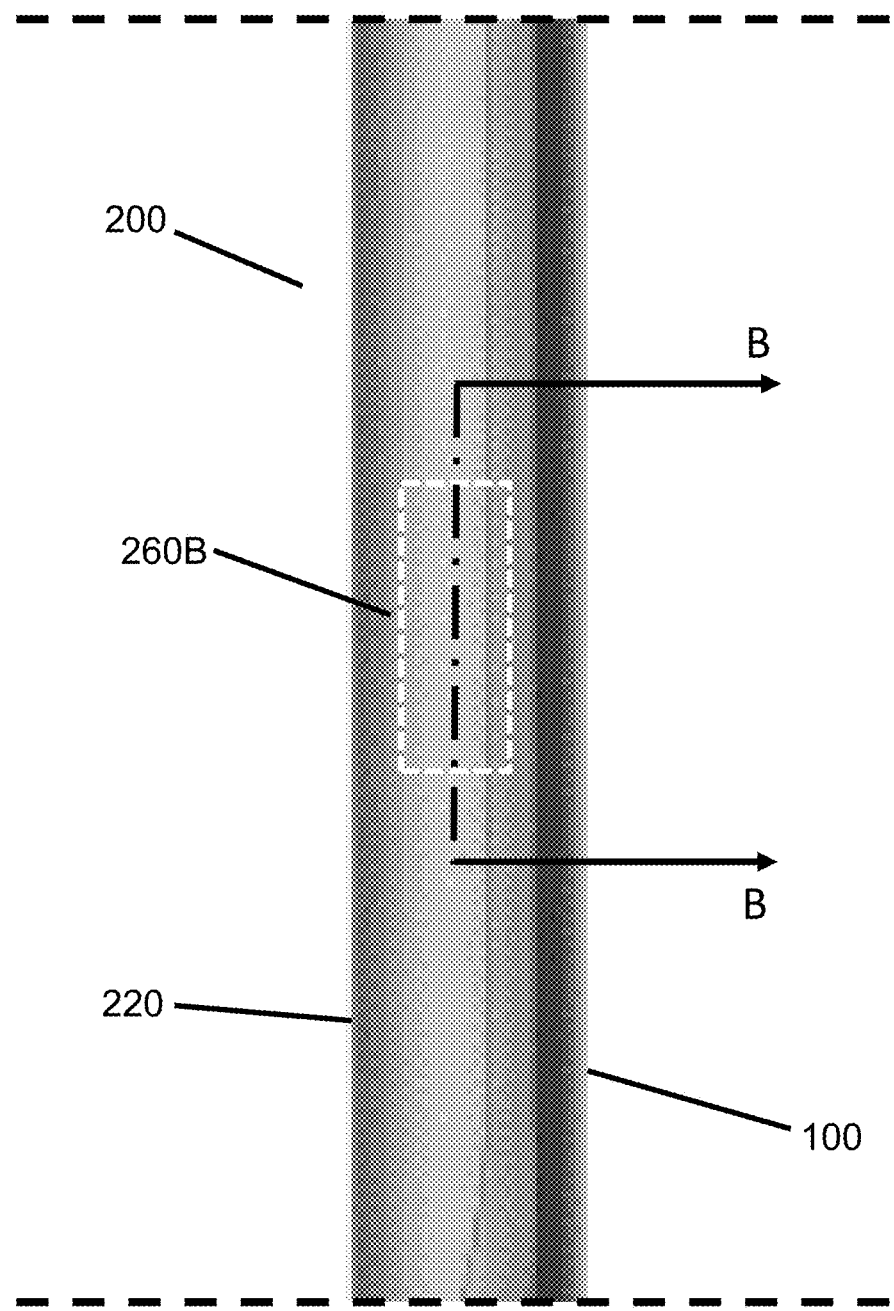
FIG. 4C illustrates a close up side view of a portion of the protective case of FIG. 4A.

FIG. 4C illustrates a close up side view of a portion of protective case 200 of FIG. 4A with electronic device 100 installed. Although not necessarily physically visible on the actual article, antenna region 260B of protective case 200 is identified for purposes of discussion and explanation. Antenna region 260B coincides with, aligns with, and/or is proximal to antenna region 160B of electronic device 100 when electronic device 100 is installed in protective case 200. Therefore, the electrical characteristics of antenna region 260B are important with respect to reducing the effect of protective case 200 on the RF signals received/transmitted by the antenna of electronic device 100 associated with antenna region 160B. Antenna regions 160B and 260B may be located in any location on electronic device 100 and protective case 200, respectively, and may be any shape or size. A cross section B-B is identified in FIG. 4C. Cross section B-B will be used to illustrate the various structures and solutions disclosed herein.

Figure 5:
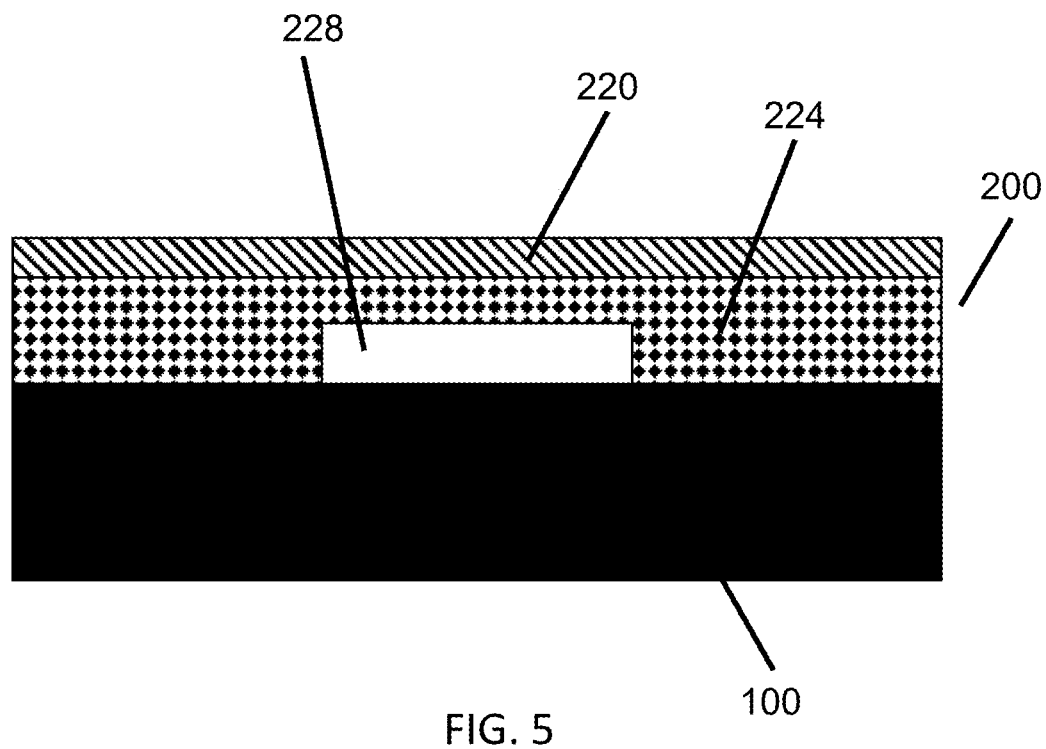
FIG. 5 illustrates the sectional view A-A of FIG. 4B and/or the sectional view B-B of FIG. 4C of the electronic device and a portion of one embodiment of the protective case.

FIG. 5 illustrates the sectional view A-A of antenna region 260A of FIG. 4B and/or the sectional view B-B of antenna region 260B of FIG. 4C of the installed electronic device 100 and a portion of one embodiment of protective case 200. In other words, FIG. 5 illustrates a cross section of antenna region 260A and/or antenna region 260B of protective case 200 with electronic device 100 installed. A cross sectional view is used to illustrate the structure of protective case 200 in this area. Protective case 200 includes outer shell 220 and an internal cushion liner 224. Typically, the internal cushion liner will be manufactured entirely of a single material, such as silicone or a thermoplastic elastomer. While these materials provide reasonably good mechanical performance characteristics, they do not necessarily have the most desirable permittivity and/or dielectric characteristics with respect to 5G signals and/or RF signals above 3 GHz.

In FIG. 5, the typical thickness and/or structure of the inner cushion liner is modified to provide a modified inner cushion liner 224 which provides improved RF characteristics in these frequency ranges. Modified inner cushion liner 224 may or may not be made of the usual materials and also includes a cavity 228 (which may also be referred to as a gap or recess) adjacent to installed electronic device 100. This structure provides improved RF characteristics relative to a typical structure which does not include cavity 228. Because cavity 228 is only included in a relatively small area of protective case 200, the overall mechanical and protective characteristics of protective case 200 are affected only minimally, if at all.

Figure 6:
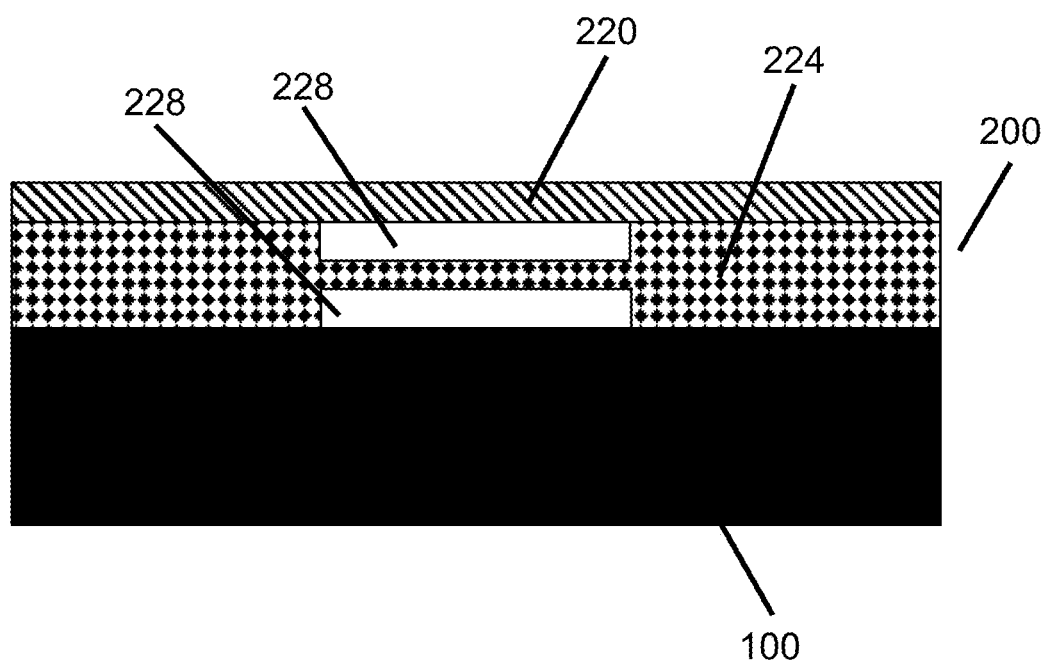
FIG. 6 illustrates the sectional view A-A of FIG. 4B and/or the sectional view B-B of FIG. 4C of the electronic device and a portion of another embodiment of the protective case.

FIG. 6 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 6 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and an internal cushion liner 224. Typically, the internal cushion liner will be manufactured entirely of a single material, such as silicone or a thermoplastic elastomer. While these materials provide reasonably good mechanical performance characteristics, they do not necessarily have the most desirable permittivity and/or dielectric characteristics with respect to 5G signals and/or RF signals above 3 GHz. The illustrated structure allows the preferred structures, materials, and/or prior designs to be used while reducing the RF effects of protective case 200.

As illustrated in FIG. 6, the typical thickness and/or structure of the inner cushion liner is modified to provide a modified inner cushion liner 224 which provides improved RF characteristics in these frequency ranges. Modified inner cushion liner 224 may or may not be made of the typical materials and also includes two cavities 228 (which may also be referred to as gaps or recesses). One cavity 228 is immediately adjacent to installed electronic device 100 and the other cavity 228 is immediately adjacent to outer shell 220. Cavities 228 may or may not be the same length, width, and/or depth as each other. This structure provides improved RF characteristics over a typical structure which does not include cavities 228. This structure reduces the signal degradation, if any, which protective case 200 may cause with respect to RF signals transmitted to/from an antenna in electronic device 100. Because cavities 228 are only included in a relatively small area of protective case 200, the overall mechanical and protective characteristics of protective case 200 are affected only minimally, if at all. This structure allows the preferred structures and materials or prior designs to be used while reducing the RF effects of protective case 200. It should be understood that the structures illustrated in FIG. 6 may also be implemented in other protective case designs. In one example, protective case 200 may not necessarily include outer shell 220.

Figure 7:
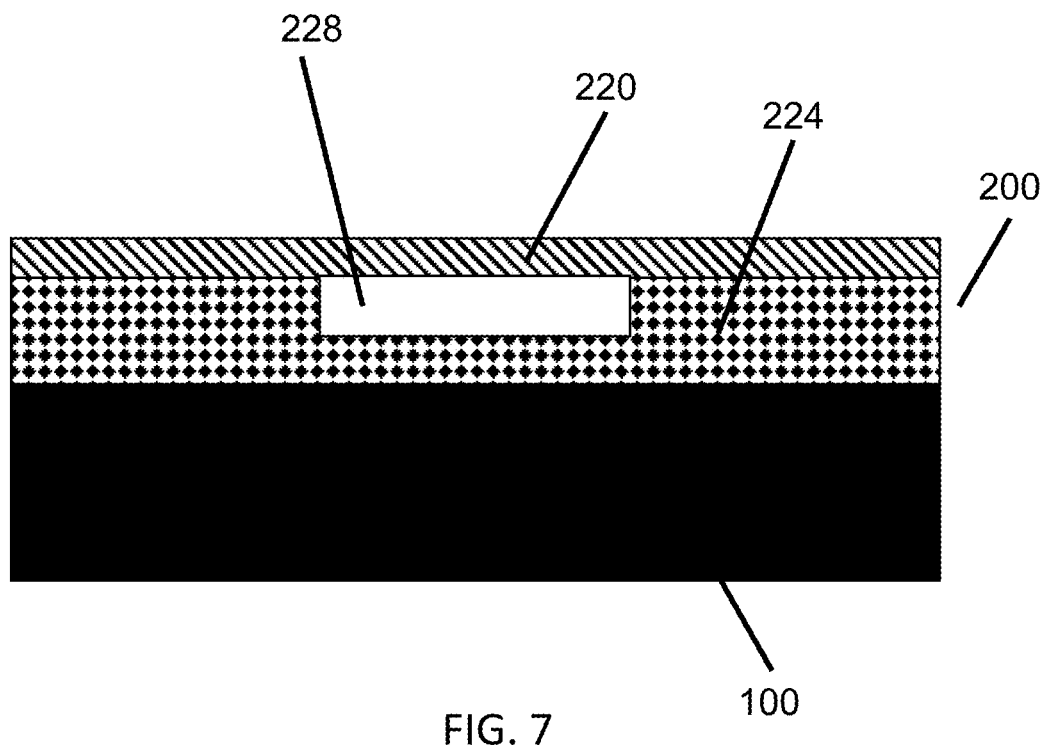
FIG. 7 illustrates the sectional view A-A of FIG. 4B and/or the sectional view B-B of FIG. 4C of the electronic device and a portion of another embodiment of the protective case.

FIG. 7 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 7 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and an internal cushion liner 224. Typically, the internal cushion liner will be manufactured entirely of a single material, such as silicone or a thermoplastic elastomer. While these materials provide reasonably good mechanical performance characteristics, they do not necessarily have the most desirable permittivity and/or dielectric characteristics with respect to 5G signals and/or RF signals above 3 GHz. The illustrated structure allows the preferred structures, materials, and/or prior designs to be used while reducing the RF effects of protective case 200.

As illustrated in FIG. 7, the typical thickness and/or structure of the inner cushion liner is modified to provide a modified inner cushion liner 224 which provides improved RF characteristics in these frequency ranges. Modified inner cushion liner 224 may or may not be made of the typical materials and also includes a cavity 228 (which may also be referred to as a gap or recess). Cavity 228 is adjacent to outer shell 220. This structure provides improved RF characteristics over a typical structure which does not include cavity 228. This structure reduces the signal degradation, if any, which protective case 200 may cause with respect to RF signals transmitted to/from an antenna in electronic device 100. Because cavity 228 is only included in a relatively small area of protective case 200, the overall mechanical and protective characteristics of protective case 200 are affected only minimally, if at all. This structure allows the preferred structures and materials or prior designs to be used while reducing the RF effects of protective case 200. It should be understood that the structures illustrated in FIG. 7 may also be implemented in other protective case designs. In one example, protective case 200 may not necessarily include outer shell 220.

Figure 8:
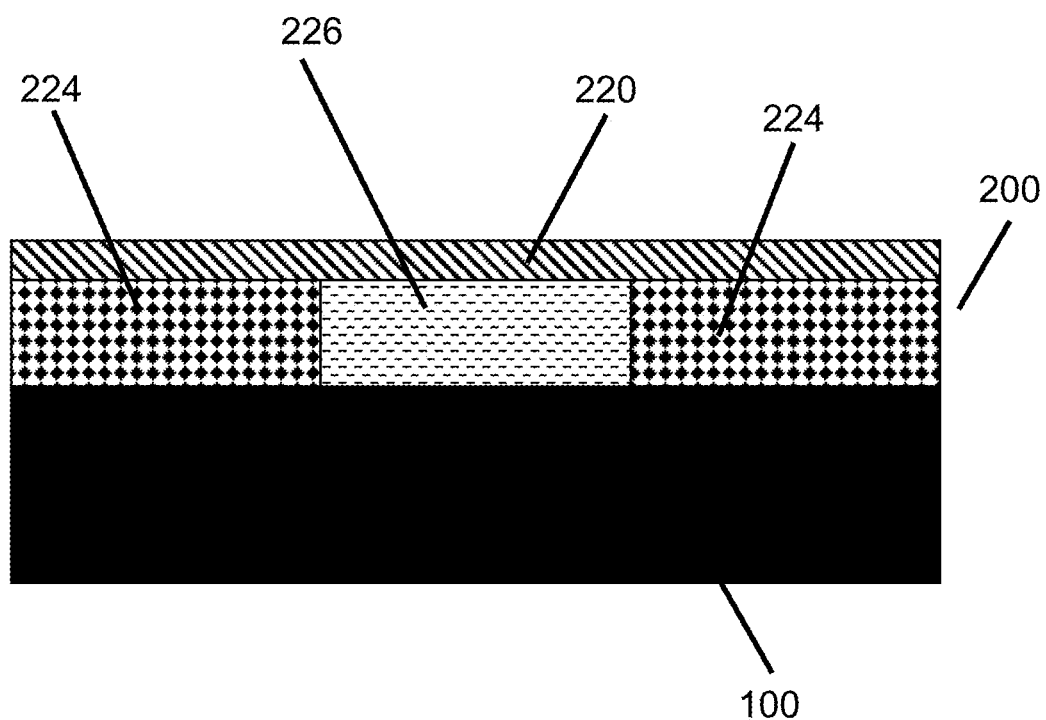
FIG. 8 illustrates the sectional view A-A of FIG. 4B and/or the sectional view B-B of FIG. 4C of the electronic device and a portion of another embodiment of the protective case.

FIG. 8 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 8 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in an antenna region 226 of internal cushion liner 224. The material making up antenna region 226 may have better permittivity and/or dielectric characteristics than the primary material of internal cushion liner 224. Antenna region 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 8, the typical inner cushion liner is modified to include a different material having improved RF characteristics in these frequency ranges. In this example, the material of modified antenna region 226 extends all the way from electronic device 100 to outer shell 220. This structure provides improved RF characteristics over a typical structure which does not include antenna region 226 and/or a different material. This structure reduces the signal degradation, if any, which protective case 200 may cause with respect to RF signals transmitted to/from an antenna in electronic device 100. Because the material of antenna region 226 is only included in a relatively small area of protective case 200, the overall mechanical and protective characteristics of protective case 200 are affected only minimally, if at all. This structure allows the preferred structures and materials or prior designs to be used while reducing the RF effects of protective case 200. It should be understood that the structures illustrated in FIG. 8 may also be implemented in other protective case designs. In one example, protective case 200 may not necessarily include outer shell 220.

The material for antenna region 226 may be chosen based on a desire to have a material with a lower dielectric constant, particularly for a given frequency range of interest. For example, the material may be chosen such that chosen area(s) of at least the inner liner have a dielectric constant of less than 2.5, less than 2.4, less than 2.3, less than 2.2, less than 2.1, less than 2.0, less than 1.9, less than 1.8, and/or less than 1.7. The material may be chosen such that chosen area(s) of at least the inner liner have a relative permittivity of less than 2.5, less than 2.4, less than 2.3, less than 2.2, less than 2.1, less than 2.0, less than 1.9, less than 1.8, and/or less than 1.7. Further, the material may also be chosen based on a desire to have a lower dielectric loss tangent in the one or more antenna areas of interest. The material may also be chosen based on a number of other factors including: durability, flexibility, moldability, resilience, appearance, price, compatibility with other materials of protective case 200, and/or various manufacturing considerations. It should be understood that the structures disclosed herein permit a material having preferred RF characteristics to be used such that they are near the antenna(s) of an installed electronic device, while still using a preferred material for most of the internal cushion liner which has otherwise preferred mechanical performance characteristics.

Figure 9:
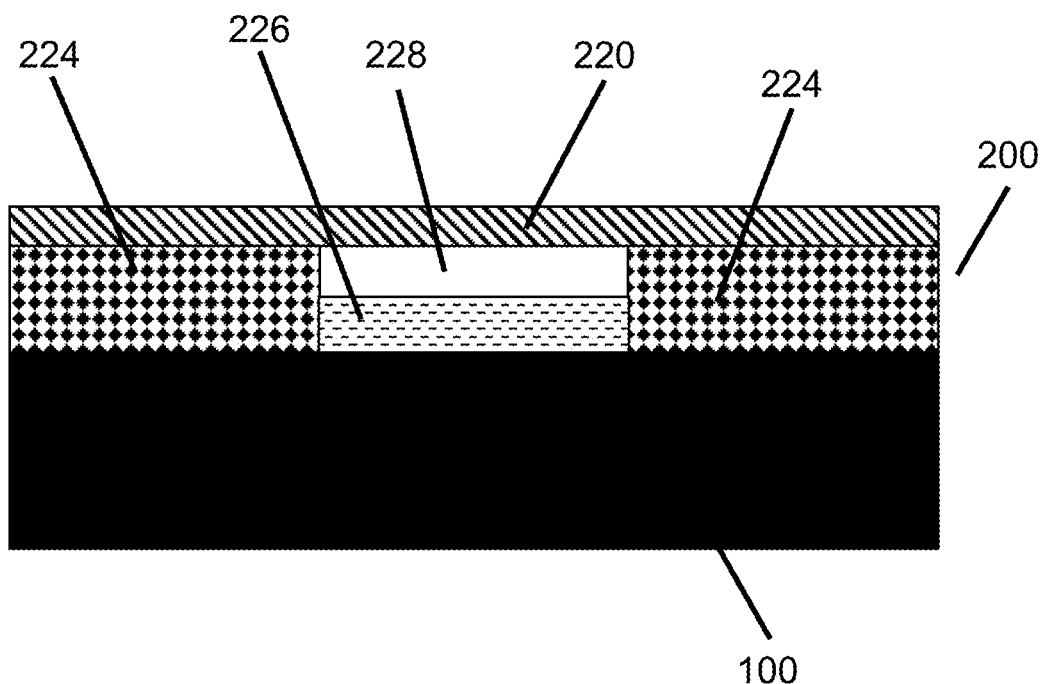
FIG. 9 illustrates the sectional view A-A of FIG. 4B and/or the sectional view B-B of FIG. 4C of the electronic device and a portion of another embodiment of the protective case.

FIG. 9 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 9 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in an antenna region 226 of internal cushion liner 224 as well as a gap or recess 226. The material making up antenna region 226 may have better permittivity and/or dielectric characteristics than the primary material of internal cushion liner 224. Antenna region 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 9, the typical inner cushion liner is modified to include a different material having improved RF characteristics in these frequency ranges. In this example, the material of modified antenna region 226 extends up from installed electronic device 100 but also includes air gap or cavity 228 between it and outer shell 220. This structure provides improved RF characteristics over a typical structure which does not include antenna region 226 and/or a different material. This structure reduces the signal degradation, if any, which protective case 200 may cause with respect to RF signals transmitted to/from an antenna in electronic device 100. Because the material of antenna region 226 is only included in a relatively small area of protective case 200, the overall mechanical and protective characteristics of protective case 200 are affected only minimally, if at all. This structure allows the preferred structures and materials or prior designs to be used while reducing the RF effects of protective case 200. It should be understood that the structures illustrated in FIG. 9 may also be implemented in other protective case designs. In one example, protective case 200 may not necessarily include outer shell 220.

Figure 10:
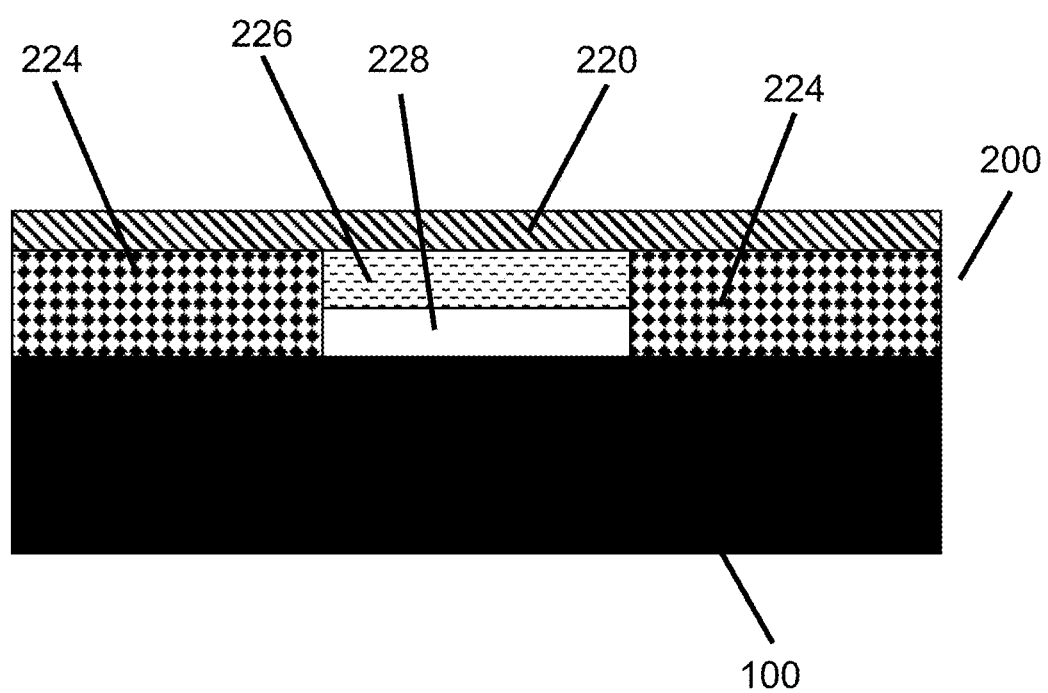
FIG. 10 illustrates the sectional view A-A of FIG. 4B and/or the sectional view B-B of FIG. 4C of the electronic device and a portion of another embodiment of the protective case.

FIG. 10 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 10 illustrates a cross section of antenna region 260A and/or antenna region 260B of protective case 200 with electronic device 100 installed.

A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in an antenna region 226 of internal cushion liner 224 as well as a gap, recess, or cavity 228. The material making up antenna region 226 may have better permittivity and/or dielectric characteristics than the primary material of internal cushion liner 224. Antenna region 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 10, the typical inner cushion liner is modified to include a different material having improved RF characteristics in these frequency ranges. In this example, the material of modified antenna region 226 extends downward from outer shell 220 and also includes air gap or cavity 228 between it and installed electronic device 100. This structure provides improved RF characteristics over a typical structure which does not include antenna region 226 and/or a different material. This structure reduces the signal degradation, if any, which protective case 200 may cause with respect to RF signals transmitted to/from an antenna in electronic device 100. Because the material of antenna region 226 is only included in a relatively small area of protective case 200, the overall mechanical and protective characteristics of protective case 200 are affected only minimally, if at all. This structure allows the preferred structures and materials or prior designs to be used while reducing the RF effects of protective case 200. It should be understood that the structures illustrated in FIG. 10 may also be implemented in other protective case designs. In one example, protective case 200 may not necessarily include outer shell 220.

Figure 11:
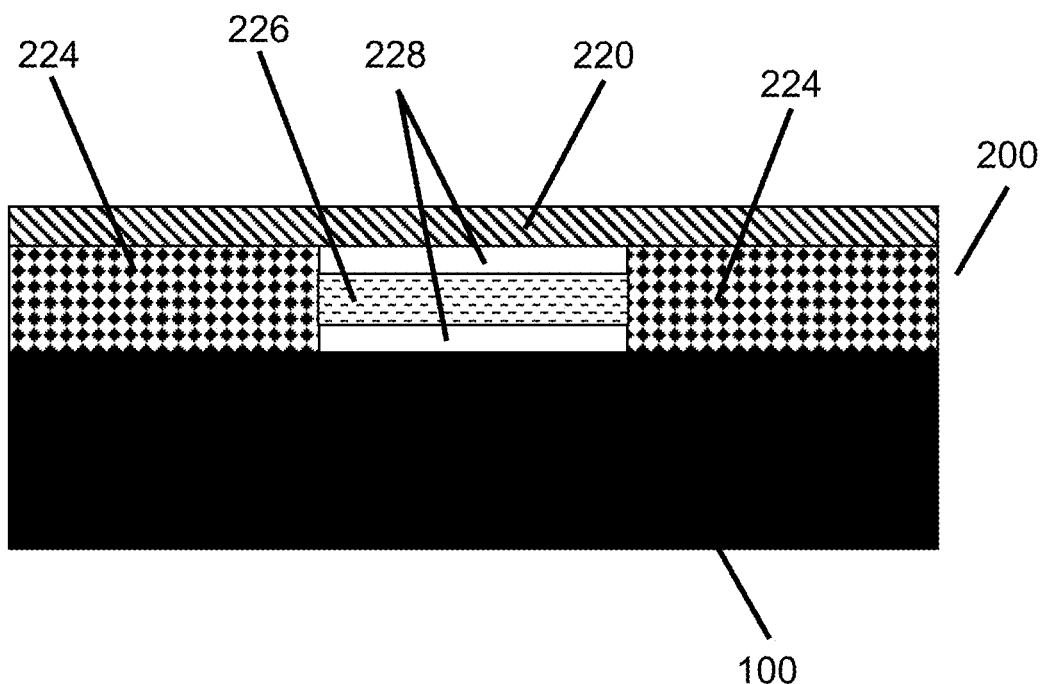
FIG. 11 illustrates the sectional view A-A of FIG. 4B and/or the sectional view B-B of FIG. 4C of the electronic device and a portion of another embodiment of the protective case.

FIG. 11 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 11 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in an antenna region 226 of internal cushion liner 224 as well as a gaps, recesses, or cavities 228 on both sides. The material making up antenna region 226 may have better permittivity and/or dielectric characteristics than the primary material of internal cushion liner 224. In some cases, the second material may be an instance of the first material with an additional ingredient or additive. Antenna region 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 11, the typical inner cushion liner is modified to include a different material having improved RF characteristics in these frequency ranges. In this example, the material of modified antenna region 226 is sandwiched between cavities 228. This structure provides improved RF characteristics over a typical structure which does not include antenna region 226 and/or a different material. This structure reduces the signal degradation, if any, which protective case 200 may cause with respect to RF signals transmitted to/from an antenna in electronic device 100. Because the material of antenna region 226 is only included in a relatively small area of protective case 200, the overall mechanical and protective characteristics of protective case 200 are affected only minimally, if at all. This structure allows the preferred structures and materials or prior designs to be used while reducing the RF effects of protective case 200. Like the examples of FIG. 8-10, inner cushion liner 224 may have a uniform thickness, at least in the areas of interest. In other words, the design does not require or rely on making inner cushion liner 224 thinner or having a different thickness in the areas of interest. It should be understood that the structures illustrated in FIG. 11 may also be implemented in other protective case designs. In one example, protective case 200 may not necessarily include outer shell 220.

Figure 12:
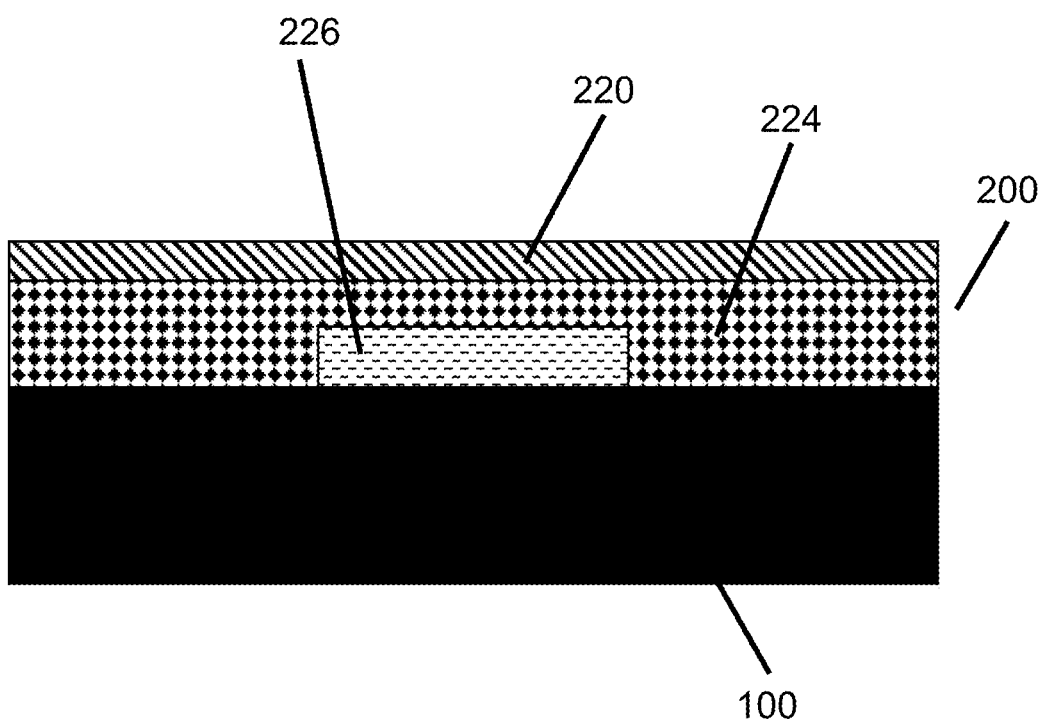
FIG. 12 illustrates the sectional view A-A of FIG. 4B and/or the sectional view B-B of FIG. 4C of the electronic device and a portion of another embodiment of the protective case.

FIG. 12 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 12 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in an antenna region 226 of internal cushion liner 224. The material making up antenna region 226 may have better permittivity and/or dielectric characteristics than the primary material of internal cushion liner 224. Antenna region 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 12, the typical inner cushion liner is modified to include a different material having improved RF characteristics in these frequency ranges. In this example, the material of modified antenna region 226 does not extend through the entire thickness of internal cushion liner 224. This structure provides improved RF characteristics over a typical structure which does not include antenna region 226 and/or a different material. This structure reduces the signal degradation, if any, which protective case 200 may cause with respect to RF signals transmitted to/from an antenna in electronic device 100. Because the material of antenna region 226 is only included in a relatively small area of protective case 200, the overall mechanical and protective characteristics of protective case 200 are affected only minimally, if at all. This structure allows the preferred structures and materials or prior designs to be used while reducing the RF effects of protective case 200. It should be understood that the structures illustrated in FIG. 12 may also be implemented in other protective case designs. In one example, protective case 200 may not necessarily include outer shell 220.

Figure 13:
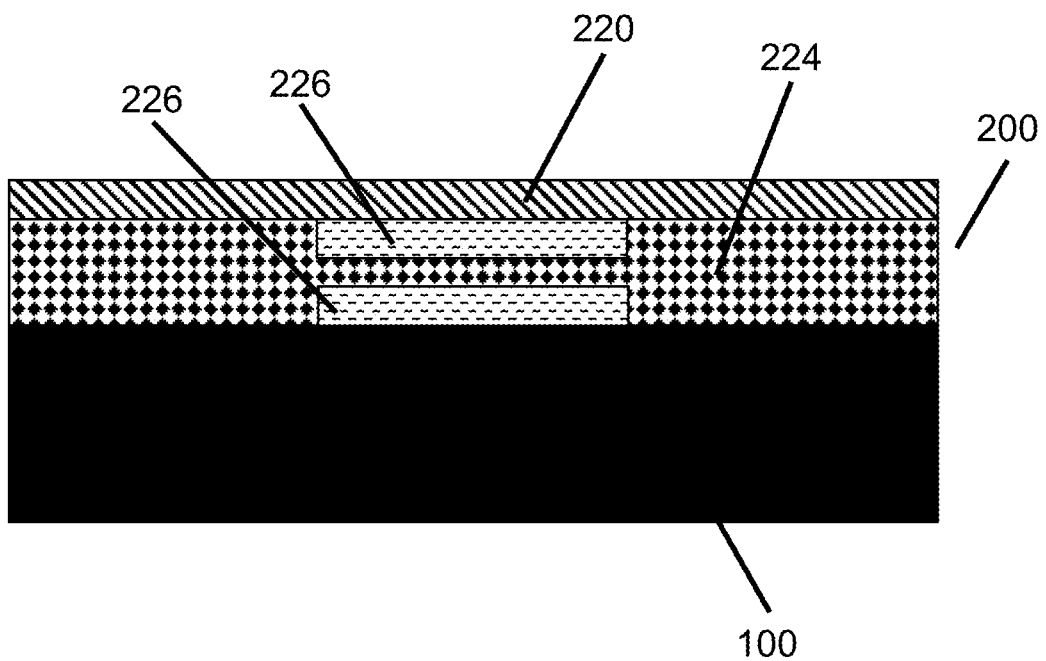
FIG. 13 illustrates the sectional view A-A of FIG. 4B and/or the sectional view B-B of FIG. 4C of the electronic device and a portion of another embodiment of the protective case.

FIG. 13 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 13 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in two antenna regions 226 of internal cushion liner 224. The material making up antenna regions 226 may have better permittivity and/or dielectric characteristics than the primary material of internal cushion liner 224. Antenna regions 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 13, the typical inner cushion liner is modified to include a two pockets of different material having improved RF characteristics in these frequency ranges. In this example, the material of modified antenna regions 226 does not extend through the entire thickness of internal cushion liner 224. This structure provides improved RF characteristics over a typical structure which does not include antenna regions 226 and/or a different material. This structure reduces the signal degradation, if any, which protective case 200 may cause with respect to RF signals transmitted to/from an antenna in electronic device 100. Because the material of antenna regions 226 is only included in a relatively small area of protective case 200, the overall mechanical and protective characteristics of protective case 200 are affected only minimally, if at all. This structure allows the preferred structures and materials or prior designs to be used while reducing the RF effects of protective case 200. It should be understood that the structures illustrated in FIG. 13 may also be implemented in other protective case designs. In one example, protective case 200 may not necessarily include outer shell 220.

Figure 14:
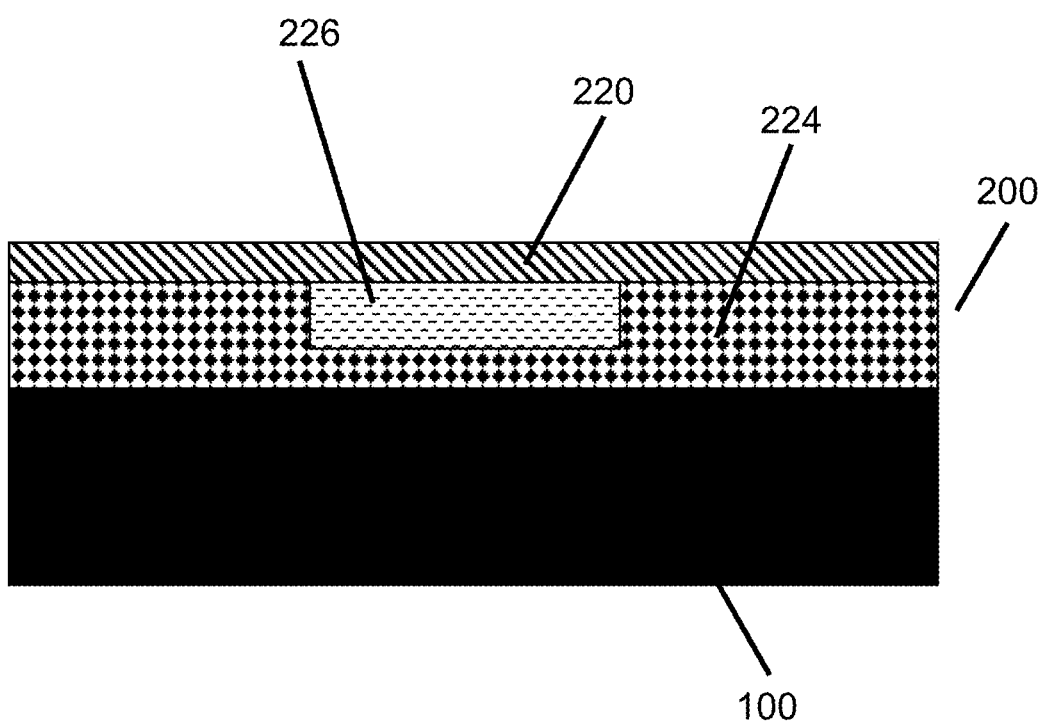
FIG. 14 illustrates the sectional view A-A of FIG. 4B and/or the sectional view B-B of FIG. 4C of the electronic device and a portion of another embodiment of the protective case.

FIG. 14 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 14 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in an antenna region 226 of internal cushion liner 224. The material making up antenna region 226 may have better permittivity and/or dielectric characteristics than the primary material of internal cushion liner 224. Antenna region 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 14, the typical inner cushion liner is modified to include a different material having improved RF characteristics in these frequency ranges. In this example, the material of modified antenna region 226 does not extend through the entire thickness of internal cushion liner 224. This structure provides improved RF characteristics over a typical structure which does not include antenna region 226 and/or a different material. This structure reduces the signal degradation, if any, which protective case 200 may cause with respect to RF signals transmitted to/from an antenna in electronic device 100. Because the material of antenna region 226 is only included in a relatively small area of protective case 200, the overall mechanical and protective characteristics of protective case 200 are affected only minimally, if at all. Like the examples of FIGS. 8, 12, and 13, the example of FIG. 14 does not include any air gaps, cavities, or recesses. This structure allows the preferred structures and materials or prior designs to be used while reducing the RF effects of protective case 200. It should be understood that the structures illustrated in FIG. 14 may also be implemented in other protective case designs. In one example, protective case 200 may not necessarily include outer shell 220.

Figure 15:
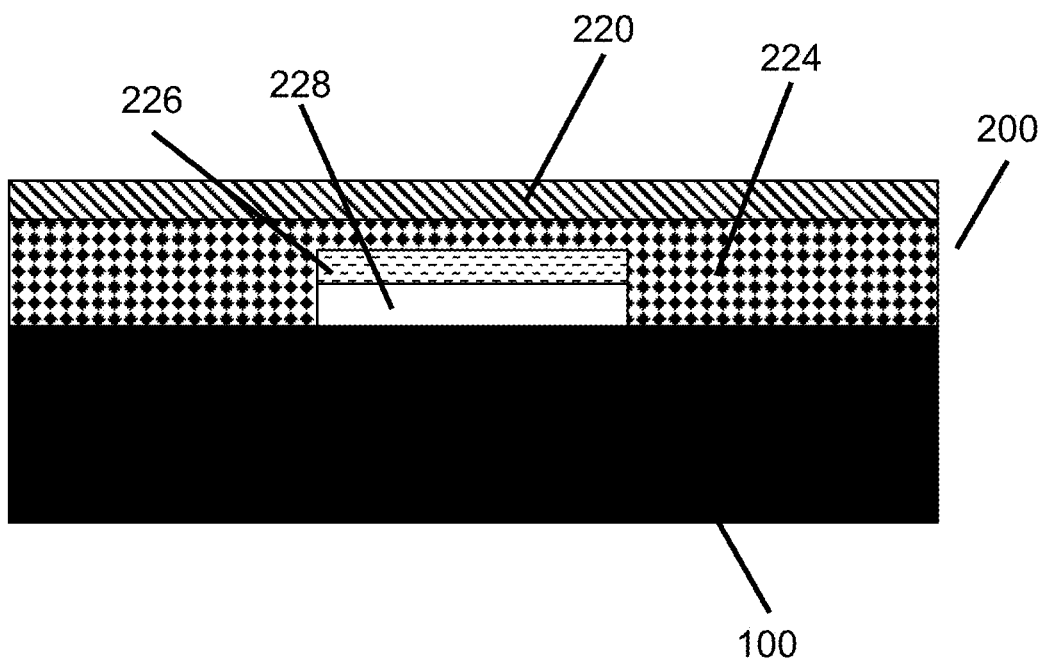
FIG. 15 illustrates the sectional view A-A of FIG. 4B and/or the sectional view B-B of FIG. 4C of the electronic device and a portion of another embodiment of the protective case.

FIG. 15 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 15 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in an antenna region 226 of internal cushion liner 224 as well as a gap, recess, or cavity 228. The material making up antenna region 226 may have better permittivity and/or dielectric characteristics than the primary material of internal cushion liner 224. Antenna region 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 15, the typical inner cushion liner is modified to include a different material having improved RF characteristics in these frequency ranges. This example is similar to that of FIG. 10 but still includes a thin layer of internal cushion member 224 extending over the material of antenna region 226 and cavity 228. This structure provides improved RF characteristics over a typical structure which does not include antenna region 226 and/or a different material. This structure reduces the signal degradation, if any, which protective case 200 may cause with respect to RF signals transmitted to/from an antenna in electronic device 100. Because the material of antenna region 226 is only included in a relatively small area of protective case 200, the overall mechanical and protective characteristics of protective case 200 are affected only minimally, if at all. This structure allows the preferred structures and materials or prior designs to be used while reducing the RF effects of protective case 200. It should be understood that the structures illustrated in FIG. 15 may also be implemented in other protective case designs. In one example, protective case 200 may not necessarily include outer shell 220.

Figure 16:
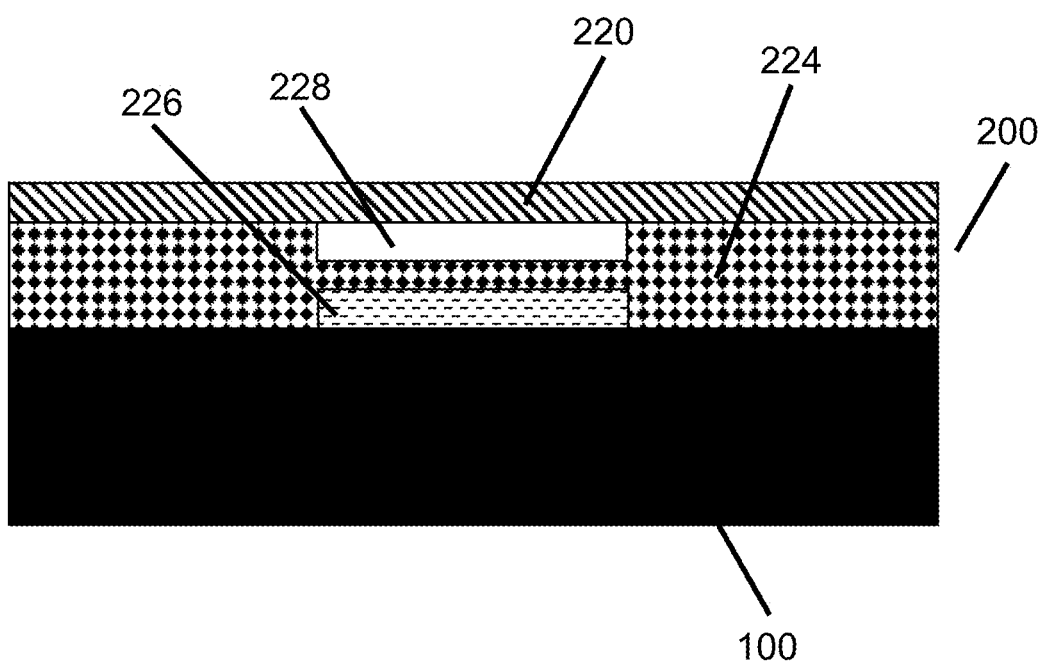
FIG. 16 illustrates the sectional view A-A of FIG. 4B and/or the sectional view B-B of FIG. 4C of the electronic device and a portion of another embodiment of the protective case.

FIG. 16 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 16 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in antenna region 226 of internal cushion liner 224 as well as a gap or cavity 228 and a layer of the material of internal cushion liner 224. The materials and gap are arranged in a different order than FIG. 15. The material making up antenna region 226 may have better permittivity and/or dielectric characteristics than the primary material of internal cushion liner 224. Antenna region 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 16, the typical inner cushion liner is modified to include a two pockets of different material having improved RF characteristics in these frequency ranges. In this example, the material of modified antenna region 226 does not extend through the entire thickness of internal cushion liner 224. This structure provides improved RF characteristics over a typical structure which does not include antenna region 226 and/or a different material. This structure reduces the signal degradation, if any, which protective case 200 may cause with respect to RF signals transmitted to/from an antenna in electronic device 100. Because the material of antenna region 226 is only included in a relatively small area of protective case 200, the overall mechanical and protective characteristics of protective case 200 are affected only minimally, if at all. This structure allows the preferred structures and materials or prior designs to be used while reducing the RF effects of protective case 200. It should be understood that the structures illustrated in FIG. 16 may also be implemented in other protective case designs. In one example, protective case 200 may not necessarily include outer shell 220.

Figure 17:
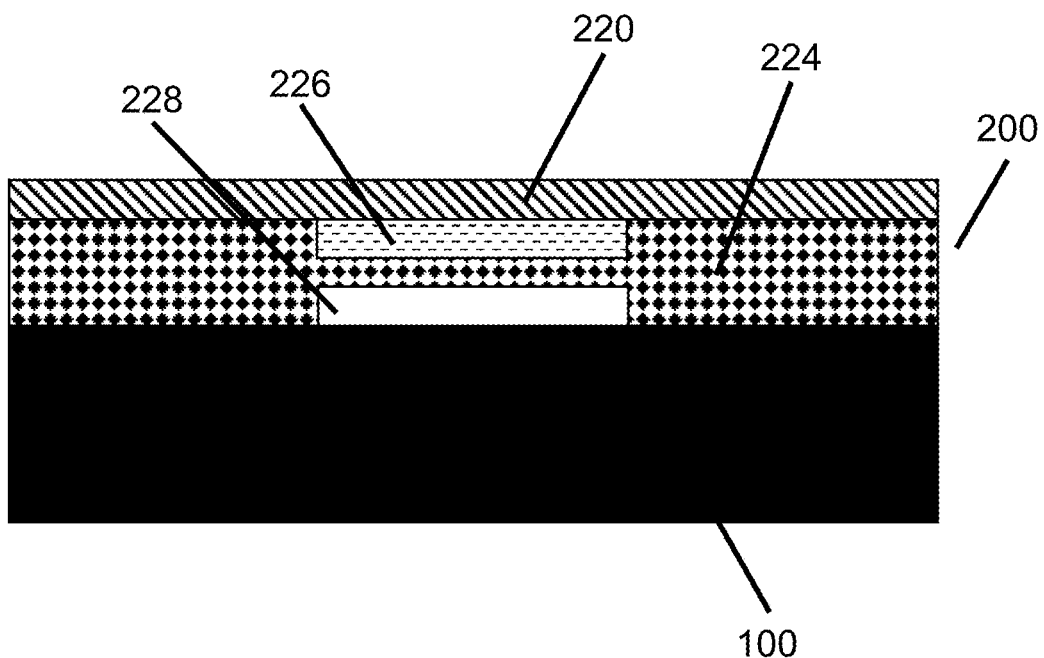
FIG. 17 illustrates the sectional view A-A of FIG. 4B and/or the sectional view B-B of FIG. 4C of the electronic device and a portion of another embodiment of the protective case.

FIG. 17 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 17 illustrates a cross section of antenna region 260A and/or antenna region 260B of protective case 200 with electronic device 100 installed. In the example of FIG. 17, the material of antenna region 226 and cavity 228 are arranged opposite to that of FIG. 16.

Figure 18:
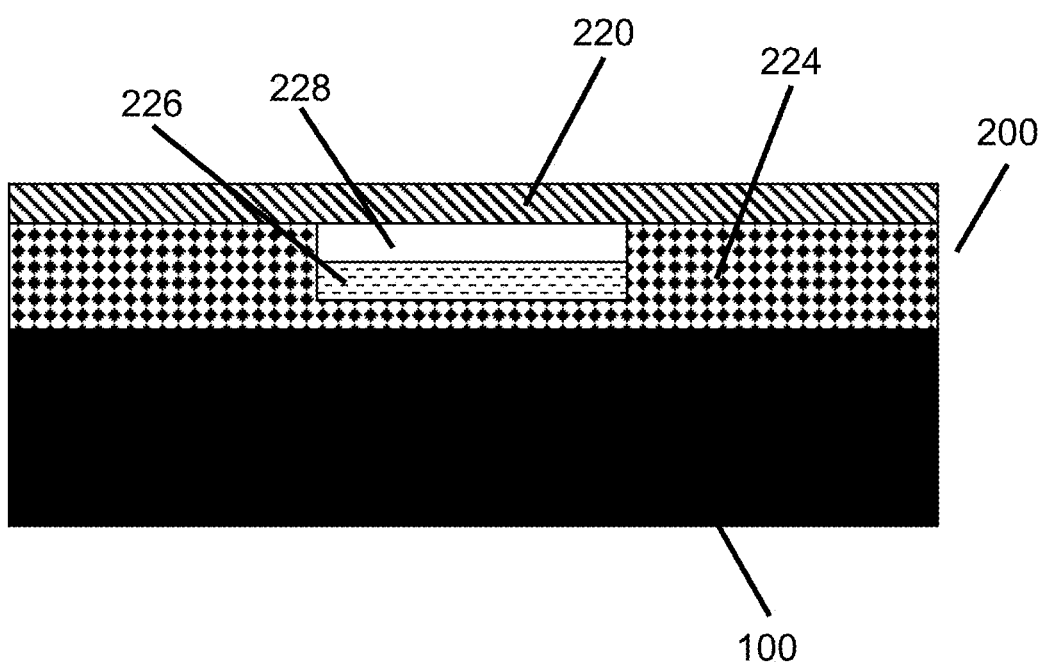
FIG. 18 illustrates the sectional view A-A of FIG. 4B and/or the sectional view B-B of FIG. 4C of the electronic device and a portion of another embodiment of the protective case.

FIG. 18 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 18 illustrates a cross section of antenna region 260A and/or antenna region 260B of protective case 200 with electronic device 100 installed. The example of FIG. 18 is similar to the example of FIG. 11 but only includes a single gap or cavity 228 and the material of antenna region 226 does not extend all the way to installed electronic device 100.

Figure 19:
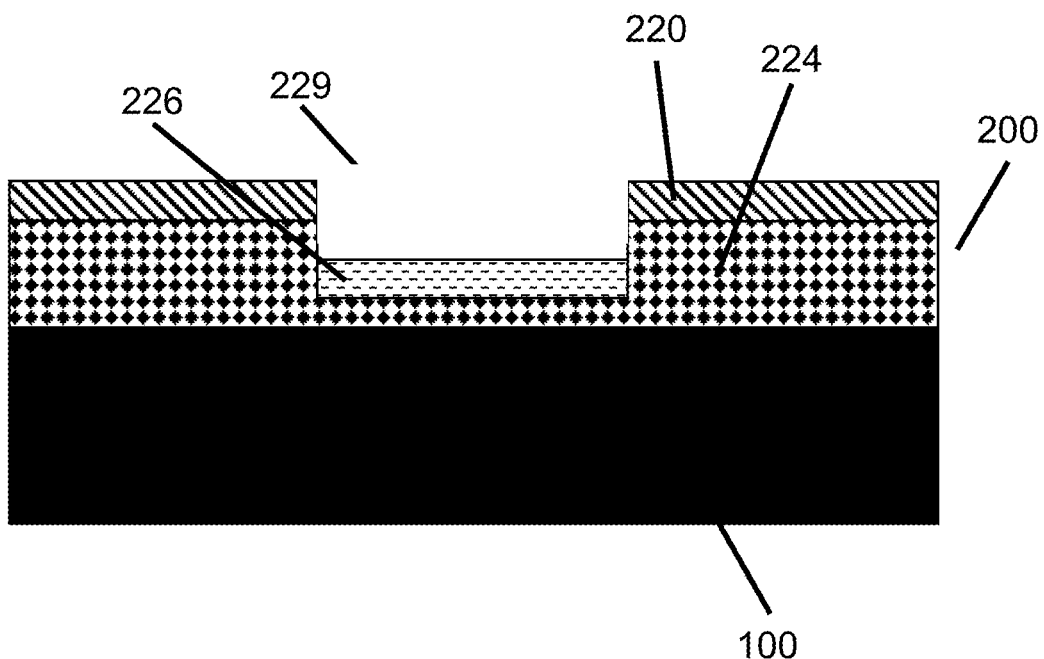
FIG. 19 illustrates the sectional view A-A of FIG. 4B and/or the sectional view B-B of FIG. 4C of the electronic device and a portion of another embodiment of the protective case.

FIG. 19 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 19 illustrates a cross section of antenna region 260A and/or antenna region 260B of protective case 200 with electronic device 100 installed. A cross sectional view is used to illustrate the structure of the protective case 200 in this area. Protective case 200 includes outer shell 220 and internal cushion liner 224. Typically, the internal cushion liner will be manufactured entirely of a single material, such as silicone or a thermoplastic elastomer. However, in this example internal cushion liner 224 includes a second material in an antenna region 226 of internal cushion liner 224. The material making up antenna region 226 may have better permittivity and/or dielectric characteristics than the primary material of internal cushion liner 224. Antenna region 226 may be comolded, overmolded, molded into, affixed, glued, or otherwise attached to internal cushion liner 224. The illustrated structure allows the preferred structures, materials, and/or prior designs to be used while also reducing the RF effects of protective case 200.

As illustrated in FIG. 19, the typical inner cushion liner is modified to include a different material having improved RF characteristics in these frequency ranges. In this example, the material of modified antenna region 226 does not extend all the way through to installed electronic device 100 and a layer of internal cushion member 224 is still present. In this example, an opening 229 extends above antenna region 226 to an area outside protective case 200, including through outer shell 220. This structure provides improved RF characteristics over a typical structure which does not include antenna region 226 and/or a different material. This structure reduces the signal degradation, if any, which protective case 200 may cause with respect to RF signals transmitted to/from an antenna in electronic device 100. Because the material of antenna region 226 is only included in a relatively small area of protective case 200, the overall mechanical and protective characteristics of protective case 200 are affected only minimally, if at all. This structure allows the preferred structures and materials or prior designs to be used while reducing the RF effects of protective case 200. Like the examples of FIGS. 7-9, 12-14, 16, and 18, this examples does not include a gap, cavity, or recess against or adjacent to the installed electronic device. It should be understood that the structures illustrated in FIG. 19 may also be implemented in other protective case designs. In one example, protective case 200 may not necessarily include outer shell 220.

Figure 20:
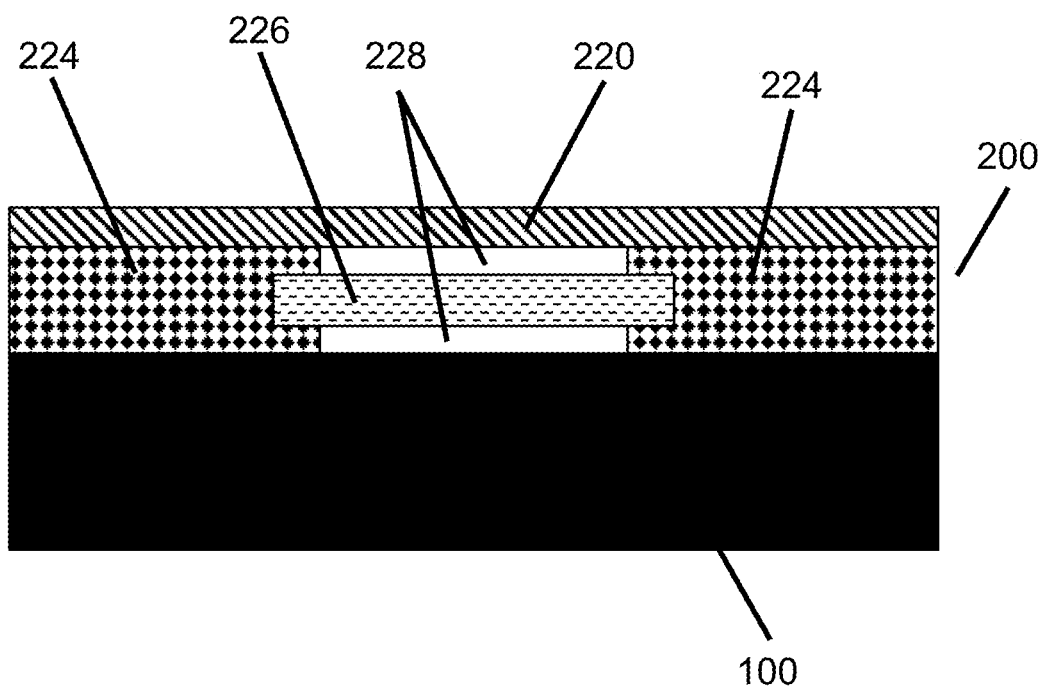
FIG. 20 illustrates the sectional view A-A of FIG. 4B and/or the sectional view B-B of FIG. 4C of the electronic device and a portion of another embodiment of the protective case.

FIG. 20 illustrates the sectional view A-A of antenna region 260A of FIG. 4B and/or the sectional view B-B of antenna region 260B of FIG. 4C of the installed electronic device 100 and a portion of another embodiment of protective case 200. In other words, FIG. 20 illustrates a cross section of antenna region 260A and/or antenna region 260B of protective case 200 with electronic device 100 installed. The example of FIG. 20 is similar to the example of FIG. 11 but the material of antenna region 226 extends further into the material of internal cushion layer 224. This type of variation may be extended to or included in any of the examples in FIG. 5-19. Like the examples of FIGS. 5-7, 10, 11, 14, 15, and 17-19, this example does not include use of a lower dielectric material, such as the material of antenna region 226, directly against or immediately adjacent to installed electronic device 100.

In some examples, two or more additional materials with different dielectric constants may be used. This may be beneficial if an electronic device has multiple antennas that are used for communications at different frequencies. One material may be chosen for use in the protective case in proximity to one of the antennas, while another material is chosen for use in proximity to a second antenna because the second antenna is used at different frequencies at which the other material has more preferred characteristics.

It should be understood that the shapes or dimensions of any of the structures or features disclosed herein may be modified while still realizing the benefits of the improvements disclosed herein. It should also be understood that the features and techniques disclosed herein may also be used in conjunction with other similar techniques, such as those disclosed in U.S. provisional patent application 62/829,899, filed on Apr. 5, 2019, the content of which is hereby incorporated by reference in its entirety.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in other situations," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention except as limited by the prior art.

What is claimed is:

1. A protective case for use with an electronic device having one or more antenna regions, the protective case comprising:
    an outer shell; and
    an inner cushion liner attached to an inner surface of the outer shell, wherein the inner cushion liner is configured to receive the electronic device when the electronic device is installed in the protective case, wherein the inner cushion liner is configured to contact and cover at least portions of a back and sides of the installed electronic device, wherein the inner cushion liner includes a first material for cushioning the installed electronic device, wherein the inner cushion liner further includes a second material in one or more regions, wherein the second material in the one or more regions is positioned to be in proximity to a respective one of the one or more antenna regions of the installed electronic device, and wherein the second material has a dielectric constant that is different than a dielectric constant of the first material in at least one operating frequency range of the electronic device.

2. The protective case of claim 1 wherein an air gap is present between the second material and the outer shell such that the second material is not immediately adjacent to the outer shell.

3. The protective case of claim 1 wherein the second material is configured such that an air gap exists between the second material and the installed electronic device such that the second material is not immediately adjacent to the installed electronic device.

4. The protective case of claim 1 wherein the one or more regions of the second material have a same thickness as adjacent areas of the first material.

5. The protective case of claim 1 wherein the second material is configured to contact the installed electronic device.

6. The protective case of claim 1 wherein the second material is configured to contact the outer shell.

7. The protective case of claim 1 wherein the second material extends into the first material from an outer surface of the first material but does not extend all the way through the first material to contact the installed electronic device.

8. The protective case of claim 1 wherein the second material extends into the first material from an inner surface of the first material but does not extend all the way through the first material to contact the outer shell.

9. The protective case of claim 1 wherein the one or more antenna regions are two or more antenna regions and the one or more regions of the second material are two or more regions of the second material each associated with a respective one of the two or more antenna regions.

10. The protective case of claim 1 wherein the operating frequency range is 3 GHz-20 GHz.

11. The protective case of claim 1 wherein the operating frequency range is 20 GHz-30 GHz.

12. A protective cover for use with an electronic device having two or more antenna regions, the protective cover comprising:
    a protective shell configured to receive the electronic device when the electronic device is installed in the protective cover, wherein the protective shell is configured to contact and cover at least portions of a back and sides of the electronic device when the electronic device is installed in the protective shell, wherein the protective shell includes a first material and a second material, wherein the second material has a dielectric constant that is different than a dielectric constant of the first material in at least one operating frequency range of the electronic device, wherein the second material is present in two or more regions of the protective shell, and wherein each of the two or more regions is configured to be in proximity to a respective one of the two or more antenna regions of the installed electronic device.

13. The protective cover of claim 12 wherein the two or more regions of the second material have a same thickness as adjacent areas of the first material.

14. The protective cover of claim 12 wherein the second material extends into the first material from an outer surface of the first material but does not extend all the way through the first material to contact the installed electronic device.

15. The protective cover of claim 12 further comprising a cushioning member for cushioning the installed electronic device.

16. The protective cover of claim 12 wherein the operating frequency range is 3 GHz-20 GHz.

17. The protective cover of claim 12 wherein the operating frequency range is 20 GHz-30 GHz.

18. A case for use with an electronic device having a housing and one or more antenna regions, the case comprising:
- a protective shell adapted to receive the electronic device when the electronic device is installed in the case, wherein the protective shell is adapted to contact and cover at least portions of the housing of the electronic device when the electronic device is installed in the protective shell, wherein the protective shell includes a first material and a second material, wherein the second material has a permittivity that is different than a permittivity of the first material in at least one operating frequency range of the electronic device, wherein the second material is present in one or more regions of the protective shell, and wherein each of the one or more regions having the second material is in proximity to a respective one of the one or more antenna regions of the installed electronic device.

19. The case of claim 18 wherein the one or more regions of the second material have a same thickness as adjacent areas of the first material.

20. The case of claim 18 further comprising a cushioning member for cushioning the installed electronic device.

21. The case of claim 18 wherein the second material extends into the first material from an inner surface of the protective shell but does not extend all the way through to an outer surface of the protective shell.

\* \* \* \* \*